(12) United States Patent
Buuck et al.

(10) Patent No.: US 9,520,036 B1
(45) Date of Patent: Dec. 13, 2016

(54) HAPTIC OUTPUT GENERATION WITH DYNAMIC FEEDBACK CONTROL

(71) Applicant: AMAZON TECHNOLOGIES, INC., Reno, NV (US)

(72) Inventors: David Charles Buuck, Prunedale, CA (US); Edward Albert Liljegren, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 356 days.

(21) Appl. No.: 14/030,454

(22) Filed: Sep. 18, 2013

(51) Int. Cl.
*H04B 3/36* (2006.01)
*G08B 6/00* (2006.01)
*G08B 3/00* (2006.01)
*G08B 3/10* (2006.01)
*G08B 1/08* (2006.01)
*G08B 5/22* (2006.01)
*G08B 23/00* (2006.01)
*G08B 7/06* (2006.01)

(52) U.S. Cl.
CPC . *G08B 6/00* (2013.01); *G08B 1/08* (2013.01); *G08B 3/00* (2013.01); *G08B 3/10* (2013.01); *G08B 5/224* (2013.01); *G08B 7/06* (2013.01); *G08B 23/00* (2013.01)

(58) Field of Classification Search
USPC .......................................... 340/384.6, 407.1
See application file for complete search history.

(56) References Cited

U.S. PATENT DOCUMENTS

| | | | | |
|---|---|---|---|---|
| 5,416,494 | A * | 5/1995 | Yokota | G09G 3/12 313/506 |
| 5,999,168 | A | 12/1999 | Rosenberg et al. | |
| 6,118,435 | A * | 9/2000 | Fujita | G06F 3/016 345/173 |
| 6,586,889 | B1 * | 7/2003 | Yaniv | G09G 3/22 313/309 |
| 6,661,563 | B2 * | 12/2003 | Hayashi | G09F 9/372 345/107 |
| 7,167,168 | B2 * | 1/2007 | Nose | G02F 1/13718 315/169.1 |
| 7,176,903 | B2 * | 2/2007 | Katsuki | G06F 3/0436 345/173 |

(Continued)

OTHER PUBLICATIONS

Point, Rufus C., "Non-final Office Action dated Jan. 16, 2015", U.S. Appl. No. 14/030,564, The United States Patent and Trademark Office, Jan. 16, 2015.

(Continued)

*Primary Examiner* — Jennifer Mehmood
*Assistant Examiner* — Rufus Point
(74) *Attorney, Agent, or Firm* — Lindauer Law, PLLC

(57) ABSTRACT

A device includes a haptic actuator to generate mechanical force stimuli in accordance with a triggering event. A haptic control system includes an accelerometer to measure the haptic response of the device. Signaling from the accelerometer is analyzed in view of an intended haptic response. A control signal may be modified in view of the analysis to correct out-of-tolerance conditions of the haptic response. This correction may occur in real time or near-real time. Component aging, shifting device performance, or other factors may be compensated for and user expectations satisfied accordingly.

20 Claims, 11 Drawing Sheets

(56) References Cited

U.S. PATENT DOCUMENTS

| | | | | |
|---|---|---|---|---|
| 7,215,329 B2* | 5/2007 | Yoshikawa | G06F 3/0414 | 178/18.01 |
| 7,227,537 B2* | 6/2007 | Nakayama | G06F 3/041 | 345/173 |
| 7,656,675 B2* | 2/2010 | Kim | G06F 1/1626 | 174/520 |
| 7,714,845 B2* | 5/2010 | Matsumoto | G06F 3/045 | 345/173 |
| 7,979,146 B2* | 7/2011 | Ullrich | G10L 21/06 | 340/407.1 |
| 7,999,660 B2* | 8/2011 | Cybart | G06F 3/016 | 340/12.54 |
| 8,077,162 B2* | 12/2011 | Endo | G06F 3/0436 | 178/18.01 |
| 8,144,133 B2* | 3/2012 | Wang | G06F 3/0414 | 345/104 |
| 8,154,527 B2* | 4/2012 | Ciesla | G06F 3/04886 | 178/18.01 |
| 8,177,942 B2* | 5/2012 | Paolini, Jr. | C08J 7/18 | 156/272.2 |
| 8,220,329 B2 | 7/2012 | Lee | | |
| 8,279,193 B1* | 10/2012 | Birnbaum | G06F 3/016 | 340/407.2 |
| 8,279,623 B2* | 10/2012 | Idzik | B06B 1/00 | 310/348 |
| 8,310,457 B2* | 11/2012 | Faubert | G06F 1/1626 | 178/18.01 |
| 8,330,590 B2* | 12/2012 | Poupyrev | G06F 3/03543 | 340/407.2 |
| 8,334,835 B2* | 12/2012 | Shen | G06F 3/0412 | 345/104 |
| 8,339,250 B2* | 12/2012 | Je | G06F 3/016 | 340/4.12 |
| 8,345,013 B2* | 1/2013 | Heubel | G06F 3/016 | 340/407.1 |
| 8,369,887 B2* | 2/2013 | Choe | G06F 1/1626 | 340/407.1 |
| 8,384,679 B2* | 2/2013 | Paleczny | G06F 3/016 | 178/18.01 |
| 8,421,610 B2* | 4/2013 | Ahn | G06F 3/016 | 340/407.2 |
| 8,704,780 B2* | 4/2014 | Son | G06F 1/1626 | 310/317 |
| 9,202,352 B2* | 12/2015 | Levesque | G08B 6/00 | |
| 2002/0025837 A1* | 2/2002 | Levy | G06F 3/0235 | 455/566 |
| 2002/0033795 A1 | 3/2002 | Shahoian et al. | | |
| 2002/0084721 A1* | 7/2002 | Walczak | H01L 41/08 | 310/339 |
| 2003/0067448 A1* | 4/2003 | Park | G06F 3/0414 | 345/173 |
| 2003/0067449 A1* | 4/2003 | Yoshikawa | G06F 3/016 | 345/173 |
| 2004/0063237 A1 | 4/2004 | Yun et al. | | |
| 2005/0134561 A1 | 6/2005 | Tierling et al. | | |
| 2005/0177287 A1 | 8/2005 | Wang et al. | | |
| 2005/0218488 A1 | 10/2005 | Matsuo | | |
| 2006/0049920 A1* | 3/2006 | Sadler | G06F 1/1626 | 340/407.1 |
| 2006/0181522 A1* | 8/2006 | Nishimura | G06F 3/016 | 345/177 |
| 2006/0192657 A1* | 8/2006 | Nishimura | G06F 3/016 | 340/407.2 |
| 2007/0013052 A1 | 1/2007 | Zhe et al. | | |
| 2008/0204417 A1* | 8/2008 | Pierce | G06F 3/0202 | 345/168 |
| 2008/0218488 A1* | 9/2008 | Yang | G09G 3/20 | 345/173 |
| 2008/0238937 A1 | 10/2008 | Muraki | | |
| 2008/0294984 A1* | 11/2008 | Ramsay | G06F 1/1626 | 715/702 |
| 2009/0002140 A1* | 1/2009 | Higa | G06F 3/0412 | 340/407.1 |
| 2009/0096746 A1 | 4/2009 | Kruse et al. | | |
| 2009/0121848 A1* | 5/2009 | Yuk | G06F 3/03547 | 340/407.2 |
| 2009/0128503 A1* | 5/2009 | Grant | G06F 3/016 | 345/173 |
| 2009/0167704 A1* | 7/2009 | Terlizzi | G06F 3/016 | 345/173 |
| 2009/0250267 A1* | 10/2009 | Heubel | G06F 3/041 | 178/18.03 |
| 2010/0090813 A1* | 4/2010 | Je | G06F 3/016 | 340/407.2 |
| 2010/0141408 A1* | 6/2010 | Doy | G06F 3/016 | 340/407.2 |
| 2010/0156818 A1* | 6/2010 | Burrough | G06F 3/016 | 345/173 |
| 2010/0156823 A1* | 6/2010 | Paleczny | G06F 3/041 | 345/173 |
| 2010/0160016 A1* | 6/2010 | Shimabukuro | G07F 17/3209 | 463/16 |
| 2010/0225600 A1* | 9/2010 | Dai | G06F 3/016 | 345/173 |
| 2010/0231540 A1* | 9/2010 | Cruz-Hernandez | G06F 3/0488 | 345/173 |
| 2010/0231541 A1* | 9/2010 | Cruz-Hernandez | G06F 3/0488 | 345/173 |
| 2010/0250071 A1* | 9/2010 | Pala | B60K 35/00 | 701/48 |
| 2010/0259368 A1* | 10/2010 | Fahn | G06F 3/041 | 340/384.1 |
| 2010/0277439 A1* | 11/2010 | Charlier | G06F 1/1616 | 345/176 |
| 2010/0309141 A1* | 12/2010 | Cruz-Hernandez | G06F 3/016 | 345/173 |
| 2011/0025609 A1* | 2/2011 | Modarres | G06F 3/016 | 345/173 |
| 2011/0038114 A1 | 2/2011 | Pance et al. | | |
| 2011/0075835 A1* | 3/2011 | Hill | H04M 1/72563 | 379/418 |
| 2011/0124413 A1* | 5/2011 | Levanon | | 3/803 |
| 2011/0133910 A1* | 6/2011 | Alarcon | A61H 19/32 | 340/407.1 |
| 2011/0255732 A1* | 10/2011 | Kwon | H04R 9/06 | 381/396 |
| 2011/0261021 A1* | 10/2011 | Modarres | G06F 3/016 | 345/177 |
| 2012/0013220 A1 | 1/2012 | Kawata et al. | | |
| 2012/0127088 A1 | 5/2012 | Pance et al. | | |
| 2012/0229400 A1 | 9/2012 | Birnbaum et al. | | |
| 2012/0229485 A1 | 9/2012 | Rhodes et al. | | |
| 2012/0249462 A1* | 10/2012 | Flanagan | G06F 1/1694 | 345/173 |
| 2013/0158928 A1* | 6/2013 | Hogdal | G01C 21/20 | 702/104 |
| 2013/0227410 A1 | 8/2013 | Sridhara et al. | | |
| 2013/0328141 A1 | 12/2013 | Ararao | | |
| 2014/0104165 A1 | 4/2014 | Birnbaum et al. | | |
| 2014/0139978 A1 | 5/2014 | Kwong | | |
| 2014/0253303 A1* | 9/2014 | Levesque | G08B 6/00 | 340/407.1 |
| 2014/0268295 A1 | 9/2014 | Ehmke et al. | | |
| 2014/0306623 A1 | 10/2014 | Caffee et al. | | |
| 2015/0119108 A1* | 4/2015 | Philbin | H04M 1/72594 | 455/566 |

OTHER PUBLICATIONS

Point, Rufus C., "Final Office Action dated Jun. 30, 2015", U.S. Appl. No. 14/030,564, The United States Patent and Trademark Office, Jun. 30, 2015.

* cited by examiner

HAPTIC OUTPUT GENERATION WITH DYNAMIC FEEDBACK CONTROL

BACKGROUND

Game controllers, e-book readers, media device remote controls, smartphones, tablets, and other devices may generate vibrations or other haptic outputs to enhance video game play, acknowledge input, or to relay other information or operating status to a user. Manufacturers and providers of such devices seek to maintain and improve haptic output and user satisfaction as respective devices age or are subject to other performance altering factors.

Figure 1:
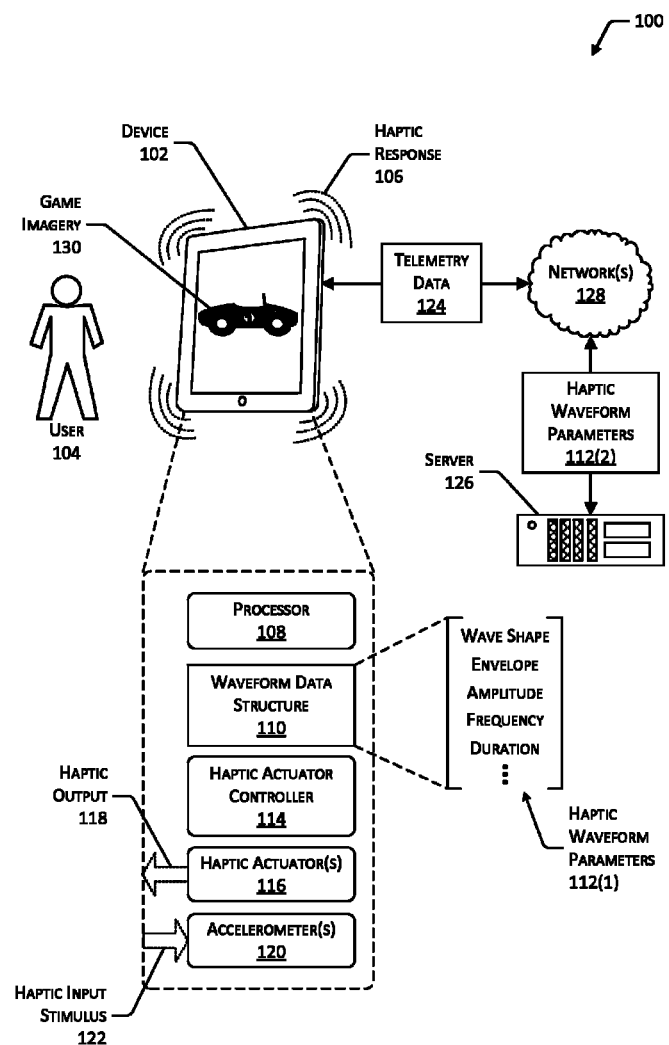
FIG. 1 is a block diagram of a system in which haptic responses are measured using one or more accelerometers.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Many devices provide output in the form of vibrations, pulses, "thumps" or other vibrotactile stimuli in response to various operations or triggering events. Non-limiting examples include the vibration of a cellular phone to indicate an incoming call, the bump of a handheld game controller in response to batting a ball in a sports game, and so forth. These and other mechanical force cues or signals are referred to as "haptic outputs".

As device applications evolve, a growing number of different haptic outputs have been developed to communicate status or other information to a user. In turn, user familiarity with various haptic outputs has also increased to the point that their respective meanings are readily distinguished. In essence, a new form of human-machine interface has emerged and many users depend upon haptic outputs for effective operation of their various devices.

A device produces a haptic output or response through the use of a haptic actuator. In one typical but non-limiting implementation, a haptic actuator includes a small magnet acting as a mass (weight) that is pulsed or oscillated against a spring using an electromagnetic coil. Other forms of haptic actuator are also used. Haptic actuators may be subject to wear, friction, magnetic field decay, electrical component drift, or other factors that reduce haptic output intensity or adversely affect other performance characteristics over time. The result of such performance changes may be ineffective haptic response or unsatisfactory user experience with the device.

In one illustrative example, a user uses a tablet computer to play an auto racing game. The racing game features numerous haptic responses such as a different vibrations signifying acceleration or braking of a race car, a dramatic thump in response to a collision, and so on. The user of the game has become accustomed to the added realism provided by these various haptic responses, to the extent that the "feel of the game" is as significant as the visual and audio presentations.

However, in the present example, the haptic actuator within the device has begun to exhibit decreased performance over time. In particular, the haptic responses have reduced in intensity, conveying a false impression to the user of degrading race car performance while playing the game. The user may experience waning interest in playing the game, or mistakenly blame the game itself as being "defective". Other applications or uses of that same tablet computer are likely to exhibit reductions in haptic output, possibly leading to user frustration with the device overall.

Haptic outputs in various devices are generated by open-loop control systems. Simply put, the control system sends an electrical signal to the haptic actuator when a haptic output (or response) is called for in the present application. The control system may condition various aspects of the electrical signal such as amplitude, frequency, and so forth. However, such haptic actuator signaling is provided without regard for the resulting haptic response. In short, such an open-loop control system issues command signals without any verification as to the results.

An accelerometer is a component that provides an electrical signal indicative of spatial acceleration of that component. That is, the electrical signal quantifies or encodes amplitude, frequency, or other characteristics of motion experienced by the accelerometer itself. Various factors such as peak or average acceleration, frequency of oscillation, spatial displacement, direction of displacement, and so forth may be determined by appropriate processing of the accelerometer signal.

As described herein, accelerometers are used to define a closed-loop dynamic feedback control systems for use in driving haptic actuators. In one non-limiting implementation, a user device includes an accelerometer that is subject to the haptic response of that device during activation of a haptic actuator. The accelerometer provides an accelerometer signal indicative of the instantaneous haptic response to a processor or other element of the control system. The control system analyzes the accelerometer signal in view of calibration data, threshold values, or other predefined parameters to determine if the haptic response of the user device is within specifications for the present haptic output.

The control system may then adjust (e.g., increase) a drive signal sent to the haptic actuator in order to compensate for a reduced haptic response, if such is detected. Conversely, an excessive haptic response may be attenuated by corresponding control action. Vibrational frequencies, haptic output periods, waveform amplitude modulation or "envelope", or other haptic response characteristics may be suitably controlled or modulated in real-time using accelerometer feedback signaling. Respective variations on the foregoing may also be used in accordance with the methods, devices and systems described herein.

FIG. 1 depicts views 100 of an illustrative system. The system of the views 100 includes particular elements and operations performed by each. The system of the views 100 is illustrative and non-limiting in nature, and other systems or respective operations are also contemplated.

A device 102 is associated with a user 104. As depicted, the device 102 is a tablet computer configured to play games or perform business or technical tasks, access various websites, present visual or audible content to the user 104, and so forth. The device 102 is also configured to exhibit various haptic responses 106 in accordance with respective triggering events. The single depicted device 102 is illustrative and non-limiting, and other systems, numbers of devices or types, may also be used. The haptic responses 106 may be vibrotactile in nature, including bumps, vibrations, pulses, knocks, or other stimuli that may be perceived by a user 104 as a physical sensation, or various combinations of these or other effects.

The device 102 includes a processor 108. The processor 108 is configured to perform various operations in accordance with an executable program code (i.e., software or firmware). The processor 108 is also configured to issue signaling to initiate or control operations resulting in haptic responses 106 from the device 102. Thus, the processor 108 is coupled to exchange data or control signals with other resources of the device 102 accordingly.

The device 102 also includes a waveform data structure 110 stored as a machine-accessible data structure within computer-readable storage media (CRSM). The waveform data structure 110 includes data or information regarding respective haptic waveform parameters 112(1). The machine-accessible data structure may include a linked list, flat file, database, table, program code, and so forth. Illustrative and non-limiting examples of such haptic waveform parameters 112(1) include wave shape, envelope (i.e., amplitude modulation, or controlled amplitude decay), amplitude, frequency, duration, and so on. The values of the respective haptic waveform parameters 112(1) are used to generate different haptic responses 106 in accordance with an associated triggering event.

The device 102 further includes a haptic actuator controller 114. The haptic actuator controller 114 is configured to receive control signaling from the processor 108 and to provide corresponding haptic waveform signals. For instance, such a control signal from the processor 108 includes or encodes particular haptic waveform parameters 112(1) for a specific haptic response 106 to be generated. In turn, the haptic actuator controller 114 provides a haptic waveform signal that is characterized by amplitude, frequency, duration, and so on in accordance with the control signal. The haptic actuator controller 114 may be defined by or include electronic circuitry, an application-specific integrated circuit (ASIC), a microcontroller, program code stored on CRSM, or other constituency.

The device 102 also includes one or more haptic actuators 116. Each haptic actuator 116 is configured to receive a haptic waveform signal from the haptic actuator controller 114 and to produce a corresponding haptic output 118. The haptic actuators 116 are mechanically coupled to a structure (housing, chassis, or other) of the device 102 such that the mechanical forces of the haptic output 118 are conveyed thereto, resulting in the haptic response 106. That is, a haptic output 118 from a given haptic actuator 116 results in a corresponding haptic response 106 of the device 102. In turn, the user 104 senses the various haptic responses 106 by way of physical contact with the device 102.

The device 102 also includes one or more accelerometers 120. Each accelerometer 120 is mechanically coupled to the structure of the device 102 and is subjected to a haptic input stimulus 122 corresponding to a particular haptic response 106. Each accelerometer 120 is configured to provide an accelerometer signal that quantifies characteristics such as amplitude, frequency, and so on, of a present haptic input stimulus 122. In one or more implementations, the respective accelerometer signals are coupled to and used by the processor 108 to adjust control signaling provided to the haptic actuator controller 114. Thus, a dynamic, closed-loop, feedback control system is defined and used.

The device 102 is also configured to communicate telemetry data 124 or other information to a server 126 by way of one or more networks 128. The network(s) 128 may include, or be defined by, the Internet or access thereto, a local area network (LAN), a wide-area network (WAN), wireless networks, and so forth. The telemetry data 124 may include measurements of respective haptic responses 106, detected anomalies or out-of-tolerance conditions, specific haptic waveform parameters being used, or other information.

The server 126 is configured to receive the telemetry data 124 from the device 102. The server 126 may also receive telemetry data 124 from numerous other devices 102 as well, of uniform or varying configurations. The server 126 is configured to generate haptic waveform parameters 112(2) and to provide these to the device 102, or other devices, by way of the network(s) 128. The server 126 may therefore communicate and exchange information with a multitude of different apparatus, with the device 102, with other servers 126, and so forth.

In one instance, the server 126 generates and provides haptic waveform parameters 112(2) in response to analyzing the telemetry data 124 toward correcting an anomaly or problem. In another instance, new haptic waveform parameters 112(2) are generated and provided as an enhancement or upgrade of an existing application or game. In yet another instance, the haptic waveform parameters 112(2) are generated and provided toward maintaining haptic response 106 qualities as the device 102 or a population of such devices 102 ages.

In one illustrative example, the user 104 uses the device 102 to play an automotive racing game, depicted by game imagery 130. The device 102 generates respective haptic responses 106 in accordance with triggering events such as acceleration, braking, collisions, and so on, as the game progresses. In response to (or in anticipation of) each triggering event, the processor 108 accesses a corresponding set of haptic waveform parameters 112(1) within the waveform data structure 110. A corresponding control signal is encoded by the processor 108 and provided to the haptic actuator controller 114.

The haptic actuator controller 114 generates a haptic waveform signal in accordance with the just-received haptic waveform parameters 112(1) and drives the haptic actuator 116 therewith. The resulting haptic response 106 is communicated to the accelerometer 120 as the haptic input stimulus 122. The accelerometer 120 provides an accelerometer signal to the processor 108, which analyzes it to determine if the instantaneous haptic response 106 is within tolerances as to amplitude, frequency, and so forth. The processor 108 may then adjust or modify the control signal to the haptic actuator control 114 according to the analysis, thus correcting any errors or deficiencies in (near) real time.

Figure 2:
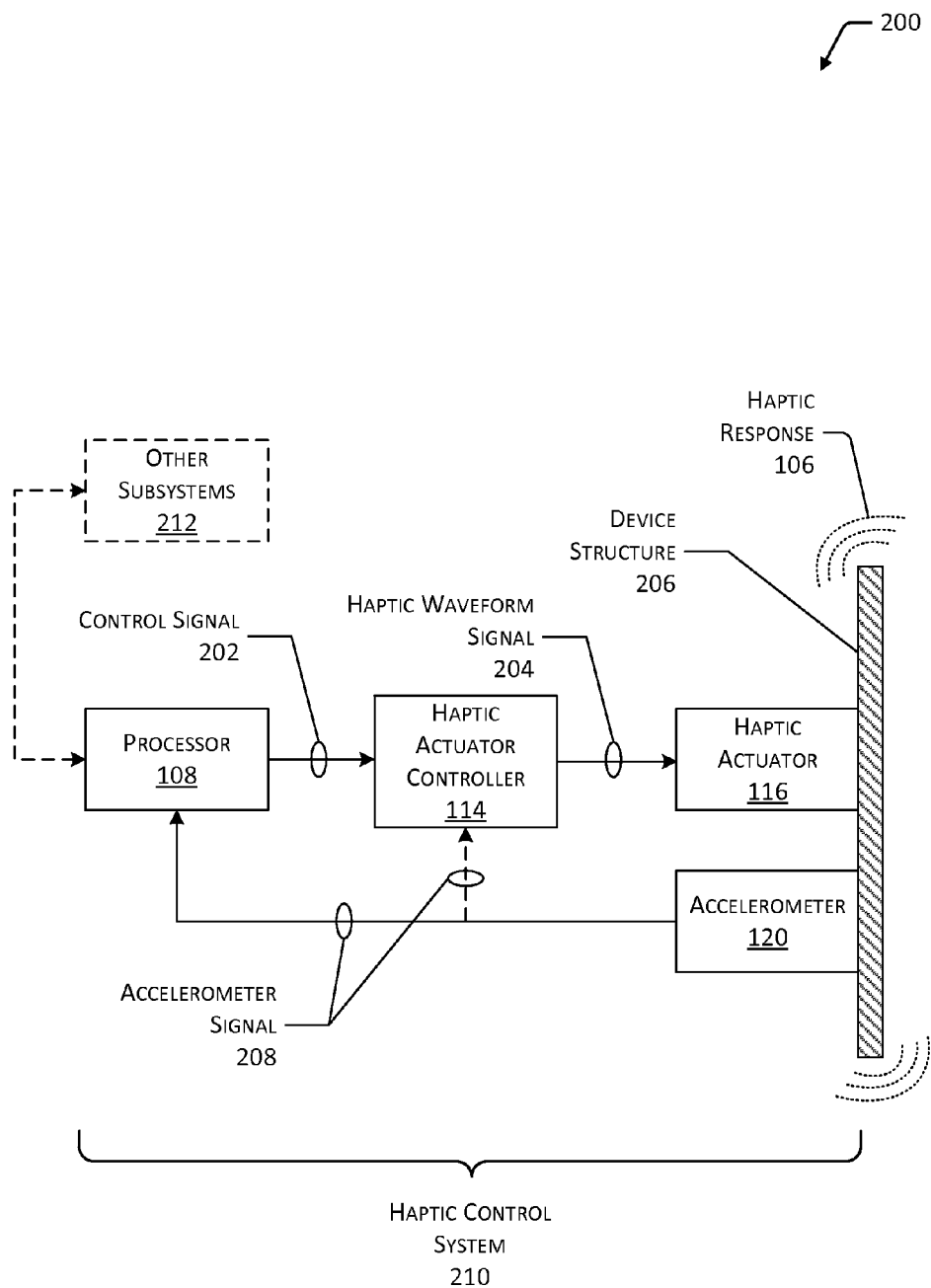
FIG. 2 is a block diagram of an illustrative haptic control system with feedback signaling.

FIG. 2 depicts views 200 of an illustrative haptic control system. The system of the views 200 includes particular elements and operations performed by each. The system of the views 200 is illustrative and non-limiting in nature, and other systems or respective operations are also contemplated.

The processor 108, as described above, provides a control signal 202 to the haptic actuator controller 114. The control signal 202 encodes or otherwise communicates one or more haptic waveform parameters 112 for a particular haptic response 106 to be generated. The control signal 202 may be digital, analog, or hybrid in format. The control signal 202 is issued in response to a triggering event, such as an occurrence within a video game, an appointment reminder, or other circumstance. In one instance, the processor 108 cross-references the particular triggering event against the corresponding haptic waveform parameters 112 within the waveform data structure 110.

The haptic actuator controller 114 receives the control signal 202 and provides a corresponding haptic waveform signal 204. In one implementation, the haptic waveform signal 204 is an analog signal defined by amplitude, frequency, envelope, or other characteristics in accordance with the haptic waveform parameters 112 of the control signal 202. In another implementation, the haptic waveform signal 204 is a pulse-width modulated (PWM) digital signal that approximates the characteristics of the haptic waveform parameters 112 of the control signal 202. Other signaling formats or modulation techniques may also be used.

The haptic actuator controller 114 may include a voltage-controlled oscillator (VCO), a phase-lock loop (PLL), a digital-to-analog converter (DAC), a dedicated-purpose microcontroller or processor, or other constituency so as to synthesize or generate the haptic waveform signal 204. As depicted, the haptic actuator controller 114 is also understood to include sufficient power handling circuitry to drive the haptic actuator 116 directly using the haptic waveform signal 204.

The haptic actuator 116 receives the haptic waveform signal 204 and provides a haptic output 118 that is mechanically coupled (or communicated) to a device structure 206. The device structure 206 may include or be defined by various rigid elements such as a housing, a support framework, a chassis, a circuit board or boards, and so on, of the device 102. As depicted, the device structure 206 is representative of the device 102 as a whole, and exhibits the haptic response 106 caused by the haptic output 118.

The accelerometer 120 is mechanically coupled to the device structure 206 and is therefore subject to the haptic response 106 by way of the haptic input stimulus 122. The accelerometer 120 provides an accelerometer signal 208 resulting from the haptic input stimulus 122. Put another way, the accelerometer 120 is configured to measure the haptic response 106 and to provide a resultant accelerometer signal 208. Thus, the accelerometer signal 208 is defined by or approximates respective parameters such as amplitude, frequency, period, and so on, indicative of corresponding characteristics of the haptic response 106.

In one implementation, the accelerometer 120 provides an analog signal correspondent to the haptic response 106 in real time. In another implementation, the accelerometer 120 provides a digital signal that encodes respective characteristics of the haptic response 106. Other suitable signaling formats may also be used. The accelerometer signal 208 (e.g., analog, digital, or hybrid) is provided to the processor 108 as a dynamic feedback signal to be used in adjusting or modifying the control signal 202. Such adjustments or modifications may be made in order to generate a particular haptic response 106 in accordance with tolerances, specifications, or other criteria.

The processor 108 may be configured, by virtue of executable code, to perform proportional-integral-derivative (PID) control, proportional (P) only control, or another suitable closed-loop control technique and to generate the control signal 202 accordingly. Additionally, the processor 108 may be configured to generate the control signal 202 so as to compensate for a phase difference between the haptic response 106 and the accelerometer signal 208. That is, the processor 108 may be configured to anticipate an inherent time lag between the haptic response 106 and the accelerometer signal 208, and to adjust the control signal 202 without treating such a time lag as an error. The processor 108 may be configured to perform other control-related functions, as well.

The processor 108, the haptic actuator controller 114, the haptic actuator 116, and the accelerometer 120, by virtue of the respective signals 202, 204 and 208, collectively define a haptic control system 210. The haptic control system 210 in turn defines a closed-loop control system. It is noted that the device structure 206 also functions as a signal pathway within the haptic control system 210 by coupling the haptic response 106 back to the accelerometer 120.

In yet another implementation, the haptic actuator controller 114 accesses particular haptic waveform parameters 112 within the waveform data structure 110 as instructed by the control signal 202. The haptic actuator controller 114 then provides the haptic waveform signal 204 accordingly. In still another implementation, the accelerometer signal 208 is received and processed (i.e., analyzed, or evaluated) by the haptic actuator controller 114. The haptic actuator controller 114 then modifies the haptic waveform signal 204 based on the accelerometer signal 208. Such an operation may be performed without modification to the control signal 202 by the processor 108.

Other subsystems 212 may also be coupled to the processor 108 and controlled accordingly. Non-limiting examples of such other subsystems 212 include an electronic display or displays, touch-activated user input devices, a power supply, wireless communications resources, and so on.

Figure 3:
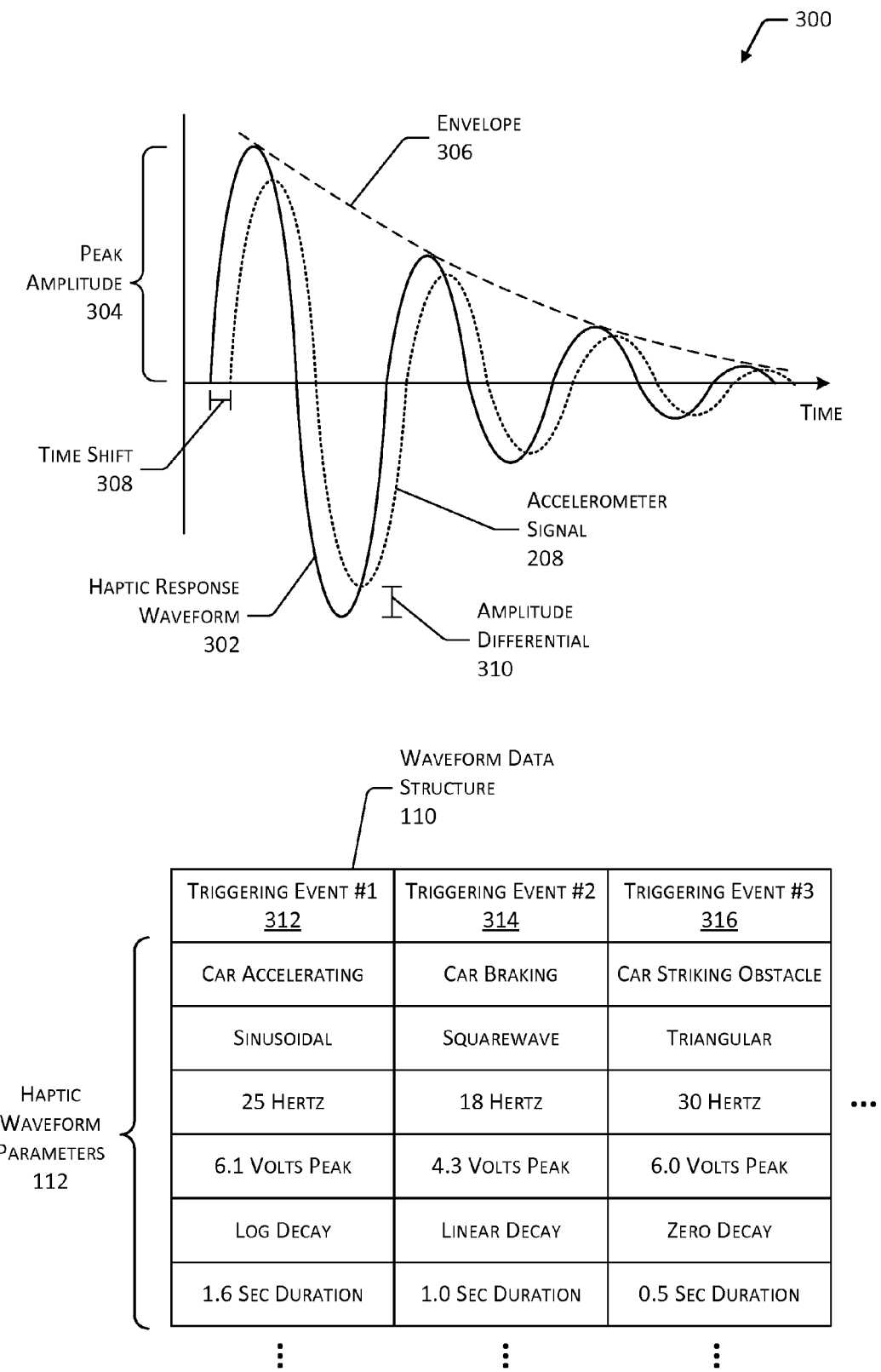
FIG. 3 depicts illustrative waveforms and a waveform data structure.

FIG. 3 depicts views 300 of illustrative waveforms and a data structure. The elements of the views 300 are non-limiting in nature, and other waveforms or data structures of respectively varying characteristics may also be used.

An illustrative haptic response waveform 302 is depicted, indicative of a particular haptic response 106 caused by a haptic output 118. Thus, the haptic response waveform 302 is illustrative of a mechanical force output or vibration exhibited by the device 102. The haptic response waveform 302 is sinusoidal in wave shape, and is characterized by a peak amplitude 304. Additionally, the haptic response waveform 302 is characterized by a logarithmic or non-linear decay in amplitude over time, thus defining an envelope 306. The period of the haptic response waveform 302 is defined by 3.5 cycles in the interest of clarity. However, other haptic response waveforms 302 defined by any number of cycles, respective frequencies, or other characteristics, may also be considered.

An illustrative example of the accelerometer signal 208 is also depicted. The accelerometer signal 208 is characterized by decaying sinusoidal amplitude in close correspondence to the haptic response waveform 302. It is noted that a time shift (or phase differential) 308 is present between the haptic response waveform 302 and the accelerometer signal 208. The time shift 308 results from the slight delay that occurs when the haptic output 118 causes the haptic response 106, which in turn results in the haptic input stimulus 122. Thus, the accelerometer signal 208 is lagging in time behind the haptic response waveform 302. Also noted is an amplitude differential 310 between the haptic response waveform 302 and the accelerometer signal 208, which is merely a matter of respective signal scaling and is depicted for clarity.

Calibration data or other techniques may be used to compensate for the time shift 308 in those instances where such a shift may be relevant. Moreover, known correspondence between the amplitude, frequency and envelope of the accelerometer signal 208 and the haptic response waveform 302 (i.e., the actual haptic response 106) are generally of greater concern. Calibration data, filtering, scaling, or other techniques may be used by the processor 108 in order to accurately gauge the haptic response 106 of the device 102 in view of the accelerometer signal 208.

An illustrative example of the waveform data structure 110 is depicted. The waveform data structure 110 includes respective triggering events 312, 314 and 316, each associated with a respective set of haptic waveform parameters 112. Each of the triggering events 312-316 corresponds to an action or event within an auto racing game. For instance, the triggering event #1 312 is associated with a car accelerating in the racing game and corresponding ones of the haptic waveform parameters 112. In particular, the triggering event #1 312 corresponds to a sinusoidal wave shape, of 25 Hertz frequency, with a peak amplitude (e.g., 304) of 6.1 Volts, characterized by a logarithmic decay, and a total duration of 1.6 seconds. And so on, for the respective haptic waveform parameters 112 of the triggering event 314 and the triggering event 316.

The processor 108 may access the data structure 110 and retrieve the respective haptic waveform parameters 112 in response to, or anticipation of, a corresponding triggering event 312-316. The processor 108 then communicates the respective haptic waveform parameters 112 to the haptic actuator controller 114 by way of the control signal 202. In turn, the haptic actuator controller 114 provides the corresponding haptic waveform signal 204 to the haptic actuator 116, and the resulting haptic response 106 is generated.

Figure 4:
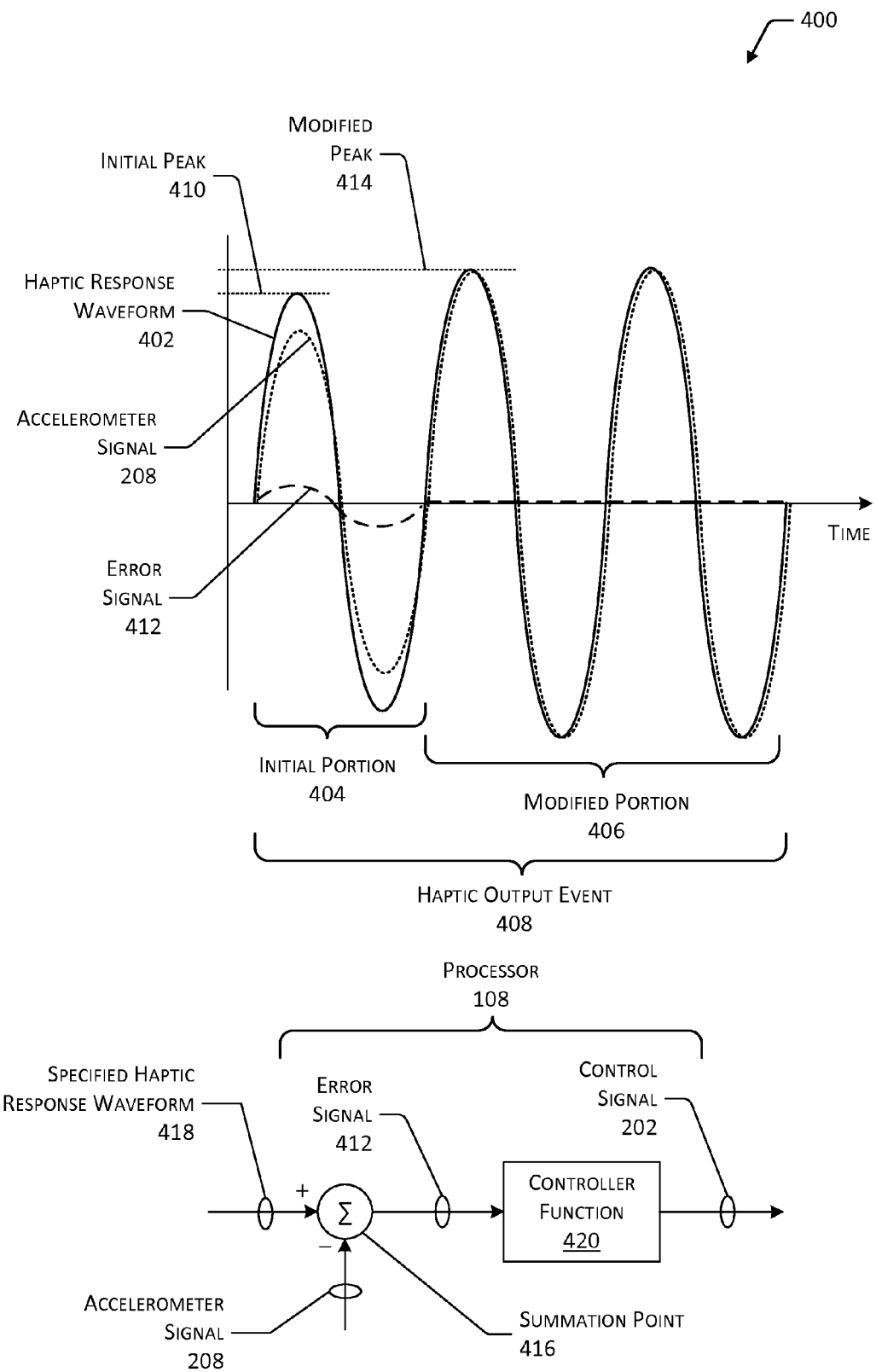
FIG. 4 depicts illustrative initial and modified portions of a haptic response waveform and an accelerometer signal.

FIG. 4 depicts views 400 of illustrative waveforms. The elements of the views 400 are non-limiting in nature, and other waveforms of respectively varying characteristics may also be used.

An illustrative example of a haptic response waveform 402 is depicted, corresponding to a particular haptic response 106. The haptic response waveform 402 is defined by an initial portion 404, which transitions immediately and smoothly into a modified portion 406. The respective portions 404 and 406 collectively define a single haptic output event 408. An illustrative example of the accelerometer signal 208 is also depicted, which corresponds to the haptic response waveform 402. Thus, the accelerometer signal 208 is also characterized by initial and modified portions 402 and 404, respectively.

In particular, the haptic response waveform 402 exhibits an initial peak 410. This initial peak 410 value is communicated by a corresponding initial peak of the accelerometer signal 208. For purposes of a present example, the processor 108 analyzes the accelerometer signal 208 and determines that the initial peak 410 is lesser than a desired or tolerance value for the present haptic response 106 to be provided. This deficiency may be due to aging of, or friction in, the haptic actuator 116, reduced output power from the haptic actuator controller 114, or other factors.

An illustrative error signal 412 is also depicted. The error signal 412 corresponds to the difference between the desired or specified amplitude of the haptic response waveform 402 and the amplitude communicated by the accelerometer signal 208. The error signal 412 is of zero or "null" value when the haptic response 106 amplitude, as measured by the accelerometer 120, is at the expected or specified value. From one perspective, the haptic control system 210 operates so as to keep the error signal 412 at or as near to zero value as possible. The processor 108 responds to the detected peak amplitude deficiency by adjusting the present control signal 202. Specifically, an amplitude of, or an amplitude parameter encoded in, the control signal 202 is increased accordingly. This modification is done in real-time, and the modified control signal 202 is issued or made effective at the beginning of the modified portion 406.

The haptic response waveform 402 now exhibits a modified peak 414 that is greater than the initial peak 410 value as a result of the modified control signal 202. In turn, the accelerometer signal 208 exhibits a corresponding increase in peak value, which is communicated to the processor 108. The processor 108 determines from the accelerometer signal 208 that the haptic response waveform 402 is now within tolerance as to amplitude, and maintains the modified content of the control signal 202. The modified peak 414 value is exhibited throughout the modified portion 406 of the haptic output event 408, and as indicated by the essentially zero value of the error signal 412.

The processor 108 may be configured to perform respective control functions in accordance with correcting or adjusting the control signal 202. As illustrated for conceptual purposes, the processor 108 operates to provide a summation point 416. The summation point 416 determines the instantaneous difference between a particular, specified (i.e., expected, or predefined) haptic response waveform 418 and the accelerometer signal 208. An output from the summation point 416 defines the error signal 412. Algebraically, this may be expressed as: Error signal 412=(predefined haptic response waveform 418)−(accelerometer signal 208).

The processor 108 may also be configured to perform a controller function 420, which operates to adjust the control signal 202 in accordance with the error signal 412. In one implementation, the controller function 420 operates to maintain the error signal 412 at or as close to zero value, as possible. The controller function 420 may employ phase or delay compensation, noise filtering, digital signal processing or filtering, PID-control, P-control, discrete-step control, or one or more other suitable methodologies.

The foregoing description illustrates operation of the haptic control system 210, including initiating a haptic response 106, detecting a deficiency therein, and correcting the haptic response 106 through a modified or adjusted control signal 202. A correction in amplitude only of the haptic response 106 was illustrated in the interest of clarity. However, analogous application of the accelerometer signal 208 may be performed to correct for deviations or errors in frequency, wave shape, envelope (rise or decay), and so forth.

Figure 5:
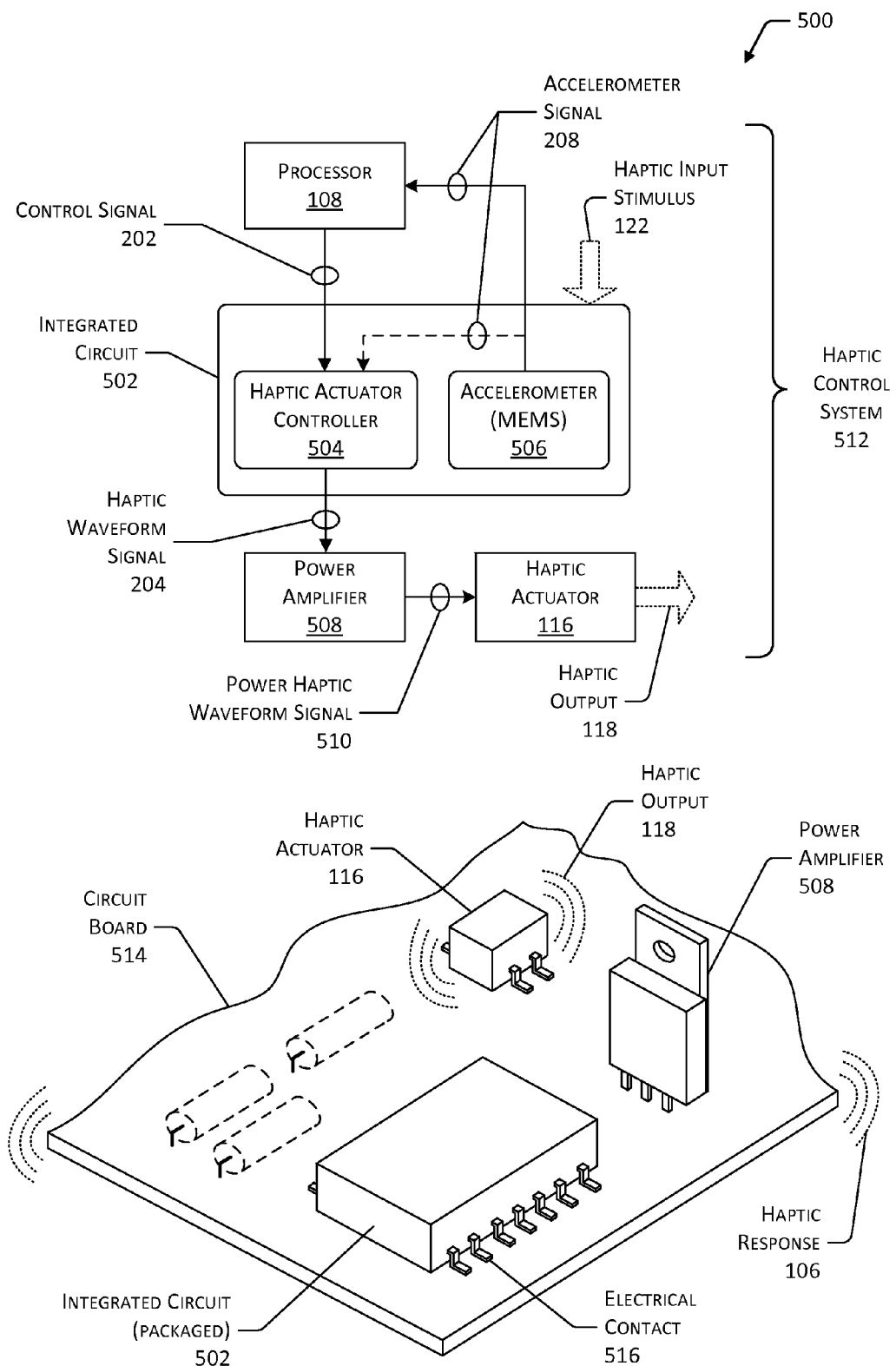
FIG. 5 depicts an illustrative haptic control system including an integrated circuit, and an electronic circuit board.

FIG. 5 depicts views 500 of an illustrative haptic control system and an electronic circuit board. The elements and operations of the views 500 are non-limiting and illustrative in nature, and constituency, configuration or operations may also be used.

An integrated circuit 502 includes a haptic actuator controller 504 and an accelerometer 506 provided therein. The haptic actuator controller 504 is analogous in operation to the haptic actuator controller 114. However, the haptic actuator controller 504 may be varied in constituency or configuration with respect to the haptic actuator controller 114. The haptic actuator controller 504 is configured to receive the control signal 202 from the processor 108 and to provide a corresponding haptic waveform signal 204. The accelerometer 506 is formed or provided as a microelectromechanical system (MEMS) device. The accelerometer 506 is analogous in operation to the accelerometer 120 and is configured to provide the accelerometer signal 208.

The haptic actuator controller 504 and the accelerometer 506 may be formed by the respective steps of the same process, or formed by respective and distinct steps or processes. Photolithography, laser etching or oblation, or other microfabrication techniques may be used while forming the haptic actuator controller 504 or the accelerometer 506. Additionally, the haptic actuator controller 504 and the accelerometer 506 may be formed on the same silicon or other semiconductor wafer (or die, after singulation).

The haptic actuator controller 504 and the accelerometer 506 may each have elements or aspects that are formed from, or using respective portions of, a monolithic semiconductor substrate. Other suitable formation processes may also be used. The resulting integrated circuit 502 defines a unitary device having at least the respective functionalities of the haptic actuator controller 504 and the accelerometer 506. The integrated circuit 502 may be packaged as a small-outline integrated circuit (SOIC), a dual-inline package (DIP), a small-outline package (SOP), a quad flat package (QFP), or in accordance with other packaging or standards. Thus, the haptic actuator controller 504 and the accelerometer 506 are hermetically sealed inside of the integrated circuit 502 packaging.

In one implementation, a power amplifier 508 is provided to amplify the haptic waveform signal 204 (or a power characteristic thereof) and to provide a power haptic waveform signal 510 that drives the haptic actuator 116. Such an implementation may be used when the haptic actuator controller 504 lacks sufficient power handling capacity due to volumetric, thermal, or other limitations of the integrated circuit 502. In another implementation, the power amplifier 508 is omitted, and the haptic waveform signal 204 drives the haptic actuator 116 directly.

The processor 108, the haptic actuator 116, the integrated circuit 502, and the power amplifier 508, collectively define a haptic control system 512. The haptic control system 512 is analogous in operation to the haptic control system 210. The haptic control system 512 defines a closed-loop control system, as well.

In another implementation, the haptic actuator controller 504 accesses particular haptic waveform parameters 112 within the waveform data structure 110 as instructed by the control signal 202. The haptic actuator controller 504 then provides the haptic waveform signal 204 accordingly. Such an operation may expedite provision of the haptic waveform signal 204, reduce workload on the processor 108, or provide other benefits.

In still another implementation, the haptic actuator controller 504 includes a processor or microcontroller that receives the accelerometer signal 208. Such a processor or microcontroller may be configured to process (i.e., analyze, or evaluate) the accelerometer signal 208. In turn, the haptic actuator controller 504 may then modify the haptic waveform signal 204 based on the analysis. Such feedback-based operations may therefore be performed without modification to the control signal 202 by the processor 108.

A circuit board 514 (or portion thereof) is also depicted. The circuit board 514 defines a portion of the device structure 206 of the device 102. The circuit board 514 supports and electrically couples the (packaged) integrated circuit 502 and the haptic actuator 116, as well as other elements not germane to the present description. The power amplifier 508 may also be included in corresponding implementations.

The integrated circuit 502 also includes respective electrical contacts (nodes, or leads) 516 disposed about the outside surface thereof in accordance with the particular form factor or applicable packaging standard. In one implementation, the control signal 202, the haptic waveform signal 204, and the accelerometer signal 208 are communicated into and out of the integrated circuit 502 by way of respective ones of the electrical contacts 516. That is, the haptic actuator controller 504 and the accelerometer 506 are electrically coupled to respective ones of the electrical contacts 516.

Operating power or other signals may also be coupled to the integrated circuit 502 by way of respective ones of the electrical contacts 516. In turn, the electrical contacts 516 are formed and configured to be electrically bonded (e.g., soldered) to respective electrical circuit pathways of the circuit board 514.

Normal illustrative operation includes control of the haptic actuator controller 504 by the processor 108. The haptic actuator 116 is driven by the power haptic waveform signal 510 (e.g., the power-amplified haptic waveform signal 204). The resulting haptic output 118 is coupled through the circuit board 514, culminating in the haptic response 106.

The circuit board 514 also serves to couple the haptic input stimulus 122 back to the accelerometer 506, within the integrated circuit 502. The accelerometer 506 provides the corresponding accelerometer signal 208 to the processor 108, thus closing a dynamic feedback control loop defined by the haptic control system 512.

Figure 6:
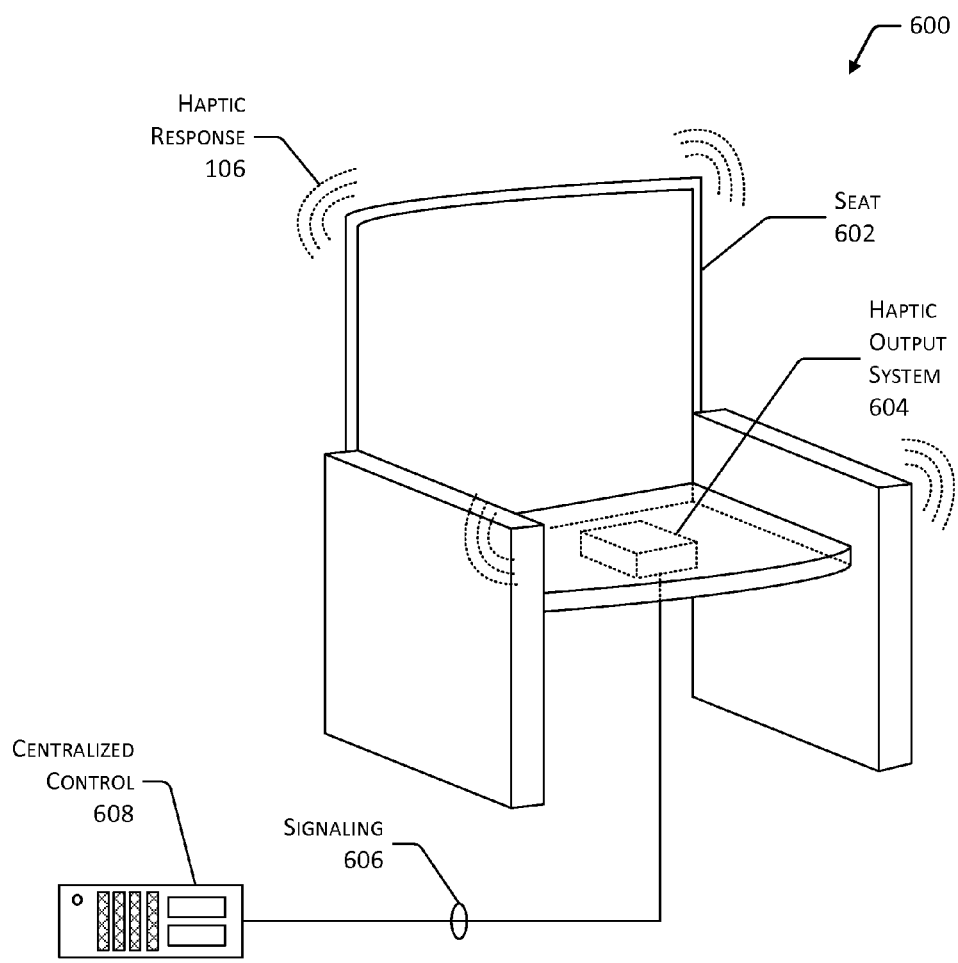
FIG. 6 depicts seating including haptic output systems.
Figure 6:
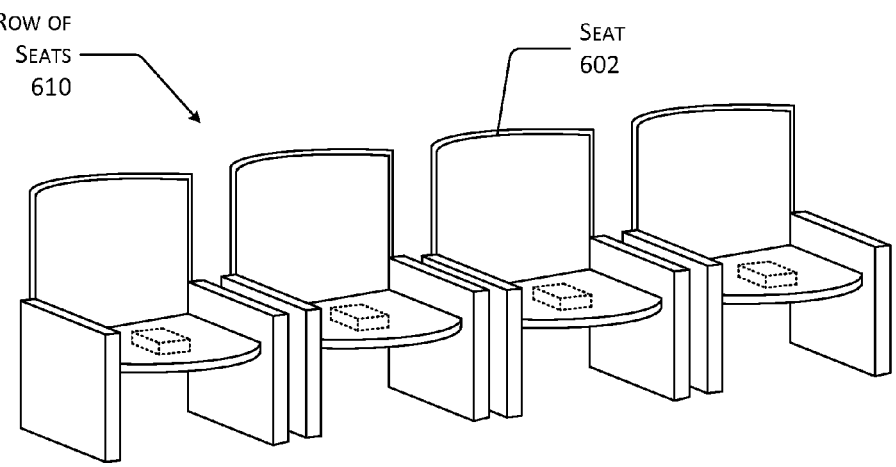

FIG. 6 depicts views 600 of an illustrative seating including haptic output systems. The elements and operations of the views 600 are non-limiting and illustrative in nature, and constituency, configuration or operations may also be used.

A seat 602 includes a haptic output system 604 disposed beneath and in mechanical contact therewith. The haptic output system 604 includes a haptic control system (e.g., 210, 512) in accordance with the descriptions herein. The haptic output system 604 is configured to generate respective haptic responses 106 in accordance with signaling 606 received from a centralized control 608. Such signaling 606 is depicted as wired signaling. However, wireless, optical waveguide, or other signaling methods may also be used.

Any number of such seats 602 may be arranged in a row 610. In one implementation, multiple rows of seats 610 may be arranged as a grid occupying a theater space before a presentation screen or stage area. In another implementation, a row of seats 610 may be arranged as part of an amusement park ride. Other implementations may also be used. The seat 602 may exhibit different vibrations, "thumps", low-frequency motions, and so forth in accordance with respective triggering events (e.g., 312) within automated, recorded, or live presentations.

Thus, haptic responses 106 may be used to add excitement or realism to presentations made in a theatrical or cinematic setting. For example, an earthquake scene in a movie may be accompanied by corresponding low-frequency rumbling of the seat 602. In another example, a dramatic door slam in a live stage play may be emphasized with a significant "thump" to the seat 602. Numerous other haptic responses 106 may be coordinated with other events or audio/visual presentations.

Furthermore, appropriate haptic responses 106 may be provided by arcade gaming devices, automotive seating, heavy equipment, amusement park rides, flight or other simulators, or any number of other applications or scenarios. The haptic control systems (e.g., 210, 512) described herein, by virtue of their closed-loop configurations, may operate to assure that various haptic responses 106 are provided in accordance with predefined specifications.

Figure 7:
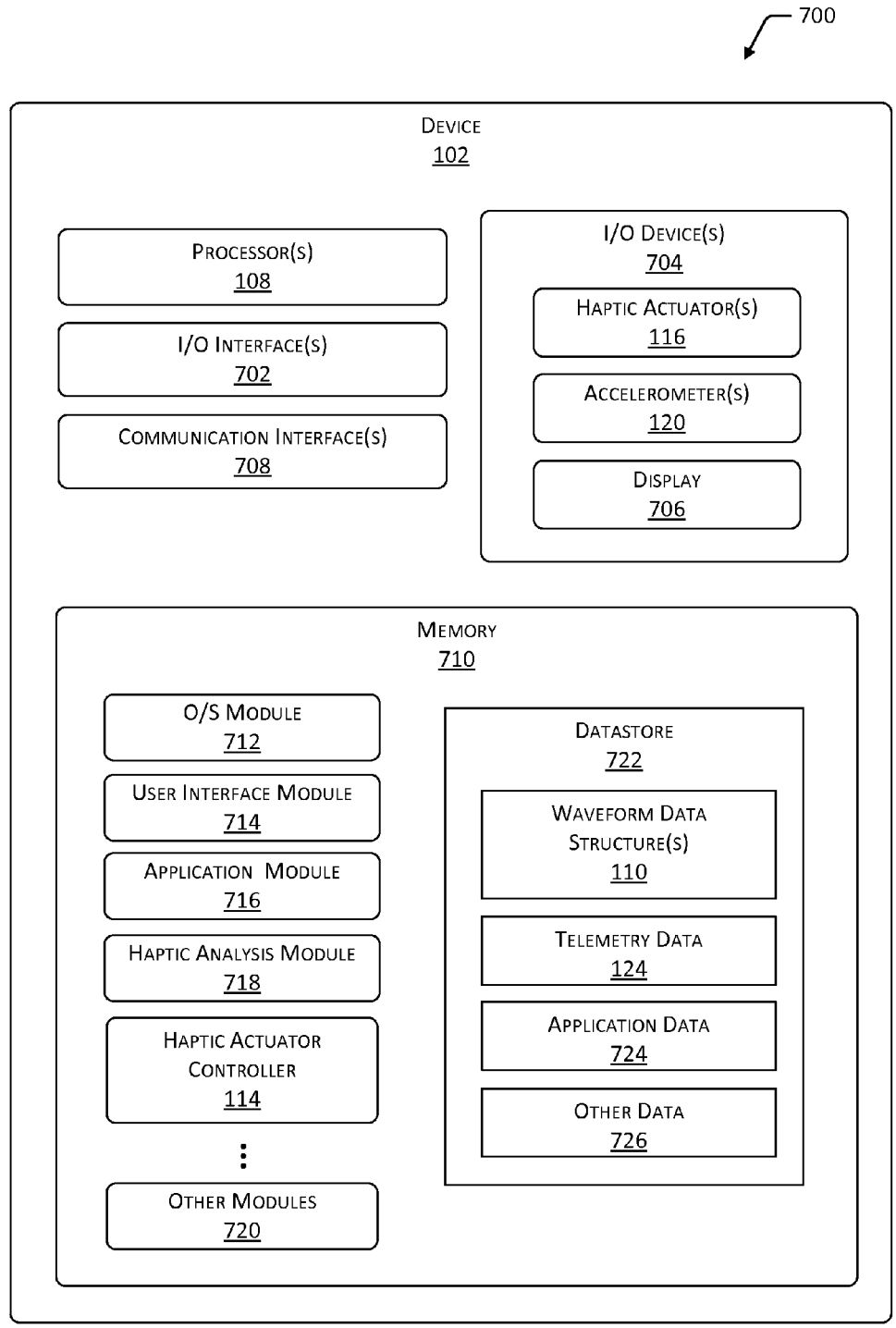
FIG. 7 is a block diagram of a device and illustrative constituency.

FIG. 7 illustrates a block diagram 700 of the device 102. The device 102 may be any device 102 including haptic response capabilities. Non-limiting examples include game controllers, e-book readers, tablet computers, smart phones, seating, video gaming furniture, passenger vehicles, heavy construction or earth-moving equipment, and so forth. Other devices 102 may include analogous or respectively varying constituency or configurations, accordingly. The device 102 may include one or more of the processors 108 configured to execute one or more stored instructions. The processor(s) 108 may comprise one or more cores.

The device 102 may include one or more I/O interface(s) 702 to allow the processor(s) 108 or other portions of the device 102 to communicate with other devices 102, or the computing device(s), and so on. The I/O interfaces 702 may comprise I2C, SPI, USB, RS-232, and so forth.

The I/O interface(s) 702 may couple to one or more I/O devices 704. The I/O devices 704 may include input devices such as one or more of a keyboard, mouse, and so forth. The I/O devices 704 may also include output devices such as one or more haptic actuators 116, one or more accelerometers 120, a display 706, audio speakers, and so forth. In some embodiments, the I/O devices 704 may be physically incorporated with the device 102, or may be externally placed.

The device 102 may also include one or more communication interfaces 708. The communication interfaces 708 are configured to provide communications between the device 102 and other devices 102, servers 126, apparatus, computing devices, routers, access points, and so forth. The communication interfaces 708 may include wireless capabilities, or devices configured to couple to one or more networks including PANs, LANs, WLANs, WANs, and so forth. The device 102 may also include one or more busses or other internal communications hardware or software that allow for the transfer of data between the various modules and components of the device 102.

As shown in FIG. 7, the device 102 includes one or more memories 710. The memory 710 comprises one or more computer-readable storage media (CRSM). The memory 710 provides storage of computer readable instructions, data structures, program modules and other data for the operation of the device 102.

The memory 710 may include at least one operating system (OS) module 712. The OS module 712 is configured to manage hardware devices such as the I/O interfaces 702, the I/O devices 704, the communication interfaces 708, and provide various services to applications or modules executing on the processors 108. Also stored in the memory 710 may be one or more of the following modules. These modules may be executed as foreground applications, background tasks, daemons, and so forth.

A user interface module 714 may be configured to provide one or more application programming interfaces. The user interface module 714 may also provide data to the device 102 that is configured to open or retrieve files, enable the rendering of webpages or their contents, or as needed for other operations, such as hypertext markup language ("HTML") files. The user interface module 714 is configured to accept inputs and send outputs using the I/O interfaces 702, the communication interfaces 708, or both.

The memory 710 may also include one or more application modules 716. The application modules 716 may be configured or modified, and selectively provided to other devices 102, computing devices, and so on. Thus, various devices can be updated or enhanced as new application modules 716 are generated, existing application modules 716 are amended or improved, and so on. The application modules 716 may respectively perform business tasks, technical operations, detect or trigger haptic-output related functions, or other operations in accordance with corresponding program code (i.e., software).

The memory 710 may further include a haptic analysis module 718. The haptic analysis module 718 may assist the processor(s) 108 in the analysis of respective accelerometer signals 208 from the accelerometer(s) 120. The haptic analysis module 718 may store or have access to various data, respective tolerances or expected performance values, or other information used to evaluate the accelerometer signals 208.

For example, the haptic analysis module 718 may communicate tolerances for amplitude, frequency, envelope, or other parameters to the processor 108, such that non-compliances may be detected, or proper performance may be verified. The haptic analysis module 718 may also provide particular values or mathematical expressions used to generate a modified or corrected control signal 202, calculate or store modified haptic waveform parameters 112 in CRSM, and so forth.

The memory 710 may also include the haptic actuator controller 114, or portions or aspects thereof that are stored or retrieved from CRSM. For example, the haptic actuator controller 114 may include program code that is executed by a microcontroller, dedicated purpose processor, or other device. The memory 710 may also include other modules 720 respectively configured to perform other functions of the device 102. For non-limiting example, the other modules 720 may include one or more respective web browsers enabling access to or presentation of respective webpages provided by servers 126, computing devices, network search functions, and so forth.

The memory 710 may also include a datastore 722 to store data and information. The datastore 722 may use a flat file, database, linked list, tree, executable code, or other data structure to store the information. In some implementations, the datastore 722 or a portion of the datastore 722 may be distributed across one or more other devices 102, or servers 126, network attached storage devices, or other apparatus.

As depicted, the datastore 722 may store one or more waveform data structures 110 as illustrated and described above. Such waveform data structures 110 may be accessed by the processors 108 in order to provide control signals 202 in accordance with respective triggering events (e.g., 312-316). Modified or new haptic waveform parameters 112 may also be stored within respective ones of the waveform data structures 110, or replace obsolete values therein, and so forth.

The datastore 722 may also store telemetry data 124 as provided to the server 126 from time-to-time. Such telemetry data 124 may include detected anomalies, specific values or quantified samples of accelerometer signals 208, or other information. The telemetry data 124 may also include particular haptic waveform parameters 112 corresponding to detected anomalies, modified haptic waveform parameters 112 derived by the device 102, and so forth.

The datastore 722 may also include application data 724, used or generated by various applications executed by the applications module 716. Business news or information, results of technical calculations, spreadsheets, word processing documents, game status information, and so forth may be included in the application data 724.

Other data 726 may also be stored in the datastore 722. For example, the other data 726 may include account information, encryption keys, access codes to respective servers 126 or other computing devices, identifying or authorization information pertaining to the user 104, and so forth.

Figure 8:
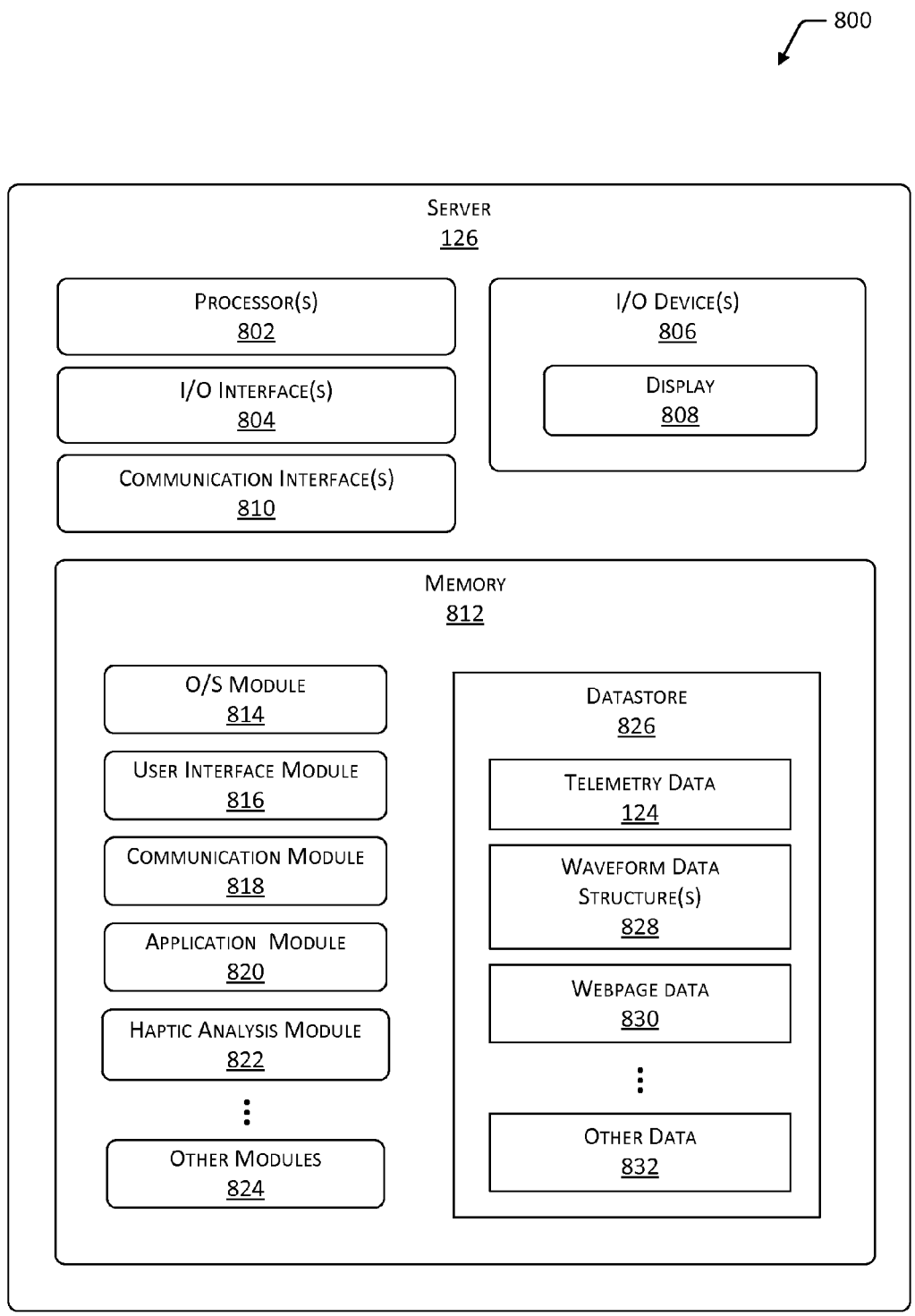
FIG. 8 is a block diagram of a server and illustrative constituency.

FIG. 8 illustrates a block diagram 800 of a server 126. In one instance, the server 126 may be a web server or other apparatus. The server 126 is illustrative and non-limiting, and other computing devices of analogous or respectively varying configuration or constituency may also be used. The server 126 may include one or more processors 802 configured to execute one or more stored instructions. The processor(s) 802 may comprise one or more cores.

The server 126 may include one or more I/O interface(s) 804 to allow the processor(s) 802 or other portions of the server 126 to communicate with the device 102, or other devices 102, other servers 126, various network 128 connected-resources, and so on. The I/O interfaces 804 may comprise I2C, SPI, USB, RS-232, and so forth.

The I/O interface(s) 804 may couple to one or more I/O devices 806. The I/O devices 806 may include one or more input devices such as a keyboard, mouse, and so forth. The I/O devices 806 may also include output devices such as one or more of a display 808, audio speakers, haptic output devices, and so forth. In some embodiments, the I/O devices 806 may be physically incorporated with the server 126, or they may be externally placed.

The server 126 may also include one or more communication interfaces 810. The communication interfaces 810 are configured to provide communications between the device (s) 102, other servers 126, routers, access points, and so forth. The communication interfaces 810 may include wireless functions, devices configured to couple to one or more networks 128 including PANs, LANs, WLANs, WANs, and so forth. The server 126 may also include one or more busses or other internal communications hardware or software that allow for the transfer of data between the various modules and components of the server 126.

The server 126 includes one or more memories 812. The memory 812 comprises one or more CRSM. The memory 812 provides storage of computer readable instructions, data structures, program modules and other data for the operation of the server 126. The memory 812 may include at least one operating system module 814. Respective OS modules 814 are configured to manage hardware devices such as the I/O interfaces 804, the I/O devices 806, the communication interfaces 810, and provide various services to applications or modules executing on the processors 802.

Also stored in the memory 812 may be one or more of the following modules. These modules may be executed as foreground applications, background tasks, and so forth. A user interface module 816 may be configured to provide one or more application programming interfaces. The user interface module 816 may also generate or provide one or more user input devices or user selection devices to a device 102. Such user interfaces may be encoded as hypertext markup language ("HTML") files, extensible markup language ("XML") files, or in another suitable format or language.

The user interface module 816 is configured to accept inputs and send outputs using the I/O interfaces 804, the communication interfaces 810, or both.

A communication module 818 is configured to support communication with the device 102, one or more other computing devices or servers 126, and so forth using the one or more networks 128. In some implementations, the communication module 818 may support encrypted communications. For example, hypertext transport protocol secured ("HTTPS") or transport layer security ("TLS") may be supported.

The memory 812 may also include one or more application modules 820. The application modules 820 may be configured or modified, and selectively provided to the device 102, other devices 102, and so on. Thus, various apparatus can be updated or enhanced as new application modules 820 are generated, existing application modules 820 are amended or improved, and so on. The application modules 820 may respectively perform business tasks, technical operations, acquire or analyze data received from other entities, and so forth, in accordance with corresponding program code (i.e., software).

The memory 812 may further include a haptic analysis module 822. The haptic analysis module 822 may be configured to receive and analyze telemetry data 124 from the device 102 or another apparatus, to derive new or modified haptic waveform parameters 112, and so forth.

For example, the haptic analysis module 822 may receive telemetry data 124 from an aging population of respective devices 102, which are experiencing similar haptic response 106 deficiencies or problems. The haptic analysis module 822 may act upon the telemetry data 124 to calculate new haptic waveform parameters 112. The new haptic waveform parameters 112 are then provided to some or all of the devices 102 of that particular population by way of the one or more networks 128. Other suitable analytical or corrective operations may also be performed. Telemetry data 124 from a population of devices 102 may also be used for other group-corrective or statistical analysis functions, and so forth. For example, the telemetry data 124 may be analyzed to determine changes in performance of the haptic actuator (s) 116 across the population of the devices 102.

In another example, telemetry data 124 may be provided to the server 126 in response to the accelerometer 120 or 506 detecting a potentially damaging event. For instance, the device 102 may be dropped onto a hard surface. Such telemetry data 124 may include an accelerometer 120 or 506 measurement of the event, or an off-scale indication, as well as date or time information, and so on. Thus, the telemetry data 124 may inform the server 126 that performance affecting-damage may have occurred, trigger the sending of information to provide to the user 104, or be used for other purposes. Other modules 824 may also be present within the memory 812, as well.

The memory 812 may also include a datastore 826 to store information. The datastore 826 may use a flat file, database, linked list, tree, executable code, or other data structure to store the information. In some implementations, the datastore 826 or a portion of the datastore 826 may be distributed across one or more other servers 126, devices 102, network attached storage devices, and so forth. The datastore 826 may store telemetry data 124 received from the device 102, from other devices 102 or other servers 126, and so on.

The datastore 826 may store one or more waveform data structures 828. Such waveform data structures 828 may be accessed by the processors 802 and used in deriving updated or modified haptic waveform parameters 112, storing such modified haptic waveform parameters 112, and so forth. The processors 802 may also define new triggering events (e.g., 312-316) and corresponding haptic waveform parameters 112, and store these in respective ones of the waveform data structures 828. In one instance, respective ones of the waveform data structures 828 are equivalent or analogous to corresponding waveform data structures 110.

The datastore 826 may store webpage data 830. The webpage data 830 may include HTML files for predefined web pages accessible by the device 102, respective content elements or objects for presentation by respective web pages, and so forth. The datastore 826 may also store other data 832. For example, the other data 832 may include textual, graphic or audio data to be provided to a requesting device 102, one or more scripts to automate respective functions, and so on.

Figure 9:
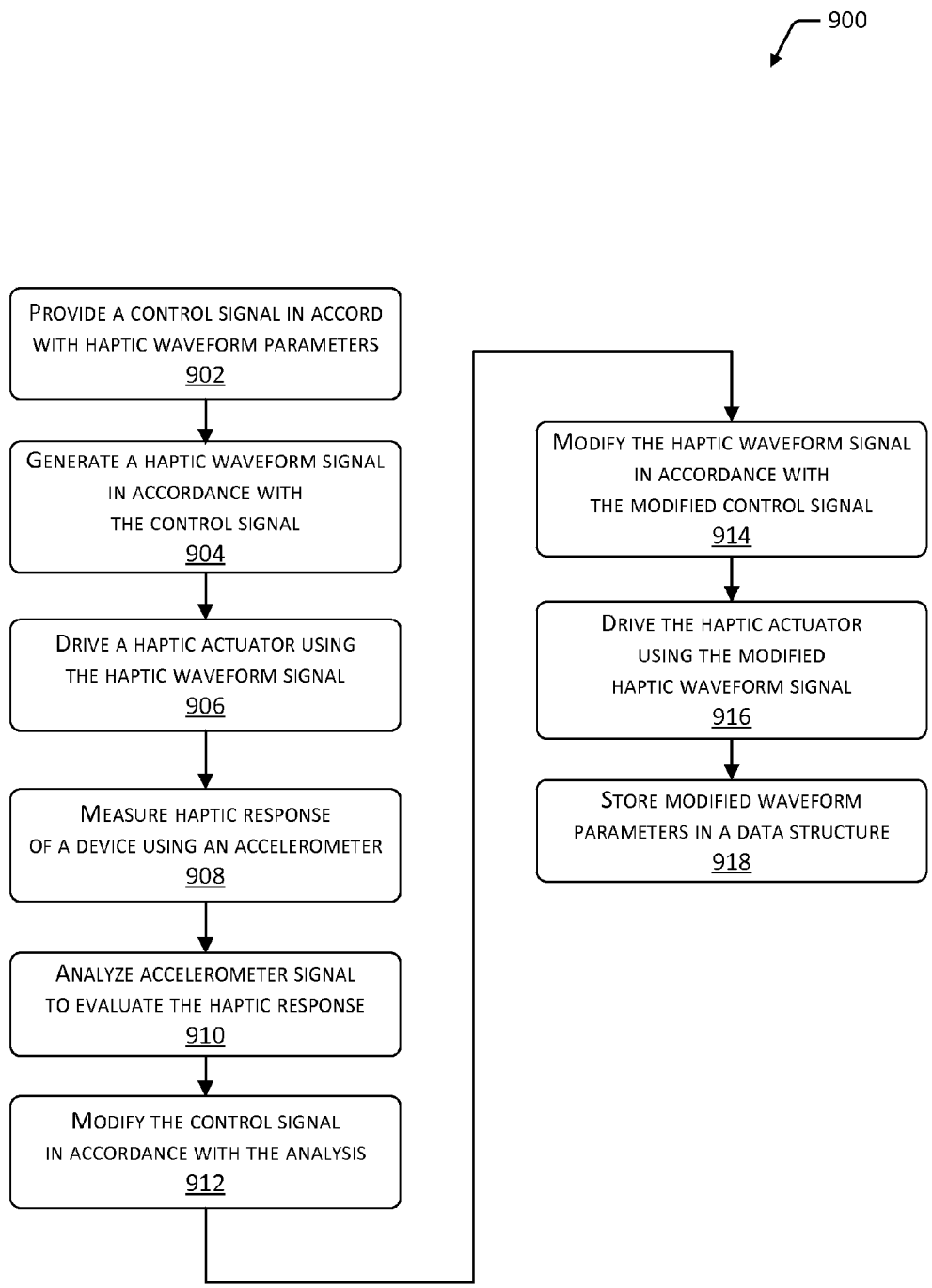
FIG. 9 is a flow diagram of an illustrative process of generating a haptic response and adjusting the characteristics thereof using feedback signaling.

FIG. 9 is a flow diagram 900 illustrating a process including the generation of a haptic response 106 to a triggering event (e.g., 312-316). In some implementations, this process may be implemented by way of the device 102, the server 126, and the respective resources of each. The process of the flow diagram 900 is illustrative and non-limiting, and other processes including one or more other steps, omitting one or more of the depicted steps, or proceeding in other orders of execution, may also be used.

Block 902 provides a control signal 202 in accordance with haptic waveform parameters 112. For purposes of a present example, the processor 108 anticipates a triggering event 312 in accordance with a car racing game being played by the user 104. Specifically, the user 104 has input a command to cause a race car to accelerate. The processor 108 accesses the waveform data structure 110 and retrieves haptic waveform parameters 112 associated with the triggering event 312. The processor 108 then digitally encodes the particular parameters within a control signal 202 that is provided to the haptic actuator controller 114.

Block 904 generates a haptic waveform signal 204 in accordance with the control signal 202. In the present example, the haptic actuator controller 114 produces a haptic waveform signal 204 defined by a sinusoidal wave shape, at 25 Hertz frequency, 6.1 Volts peak value, with a logarithmic decay, and a total duration of 1.6 seconds. These respective characteristics are in accord with those communicated by the control signal 202.

Block 906 drives the haptic actuator 116 using the haptic waveform signal 204. In the present example, the haptic actuator 116 receives the haptic waveform signal 204 and responds by generating a haptic output 118. The haptic output 118 is a damped vibratory force in accordance with the characteristics of the haptic waveform signal 204. The haptic output 118 is mechanically coupled to the device structure 206, resulting in an overall haptic response 106 of the device 102.

Block 908 measures the haptic response 106 of the device 102 using an accelerometer 120. In the present example, the haptic response 106 of the device 102 is mechanically transferred to the accelerometer 120 as a haptic input stimulus 122. The accelerometer 120 produces an accelerometer signal 208 corresponding to the respective characteristics of the haptic response 106. In the present, non-limiting illustration, the accelerometer signal 208 is an analog signal characterized by a sinusoidal wave shape of logarithmically decaying amplitude, of 25 Hertz frequency, and so on.

Block 910 analyzes the accelerometer signal 208 to evaluate the haptic response 106. In the present example, the processor 108 compares the respective characteristics of the accelerometer signal 208 against predefined tolerances, expected values, or other criteria. The processor 108 may also apply statistical, heuristic, time-domain, frequency-domain, or other analytical techniques to the accelerometer signal 208 toward quantitative or qualitative evaluation of the haptic response 106. The analysis is directed to determining if the present haptic response 106 is compliant with the intended haptic response for the triggering event 312. In the present, non-limiting illustration, the analysis reveals that the amplitude (e.g., strength or intensity) of the present haptic response 106 is 15% below the intended value.

Block 912 modifies the control signal 202 in accordance with the analysis. In the present example, the processor 108 alters the amplitude parameter encoded in the control signal 202, increasing the value by 15% in accordance with the analysis of block 910. The modified control signal 202 is provided (e.g., in real time) to the haptic actuator controller 114.

Block 914 modifies the haptic waveform signal 204 in accordance with the modified control signal 202. In the present example, the haptic actuator controller 114 modifies the haptic waveform signal 204 in view of the modified control signal 202. Therefore, the modified haptic waveform signal 204 is characterized by a 15% increase in amplitude.

Block 916 drives the haptic actuator 116 using the modified haptic waveform signal 204. In the present example, the haptic actuator controller 114 immediately increases the amplitude of the haptic waveform signal 204 in accordance with the modified control signal 202. Thus, the haptic waveform signal 204 is now characterized by about 7.02 Volts peak value, retaining the other parameters accordingly. In turn, the haptic response 106 exhibits a 15% increase in amplitude bringing the overall haptic response 106 into compliance with the intended effect.

Block 918 stores modified waveform parameters 112 in the waveform data structure 110. In the present example, the processor 108 calculated a modified peak voltage value for the triggering event 312 in block 912 above, and replaces the existing value with the newly calculated value in the waveform data structure 110. Thus, the peak voltage value of 6.1 Volts is replaced with the modified value of 7.02 volts. The modified peak voltage value may now be used in subsequent instances of the triggering event 312, until such time as it modified again.

Figure 10:
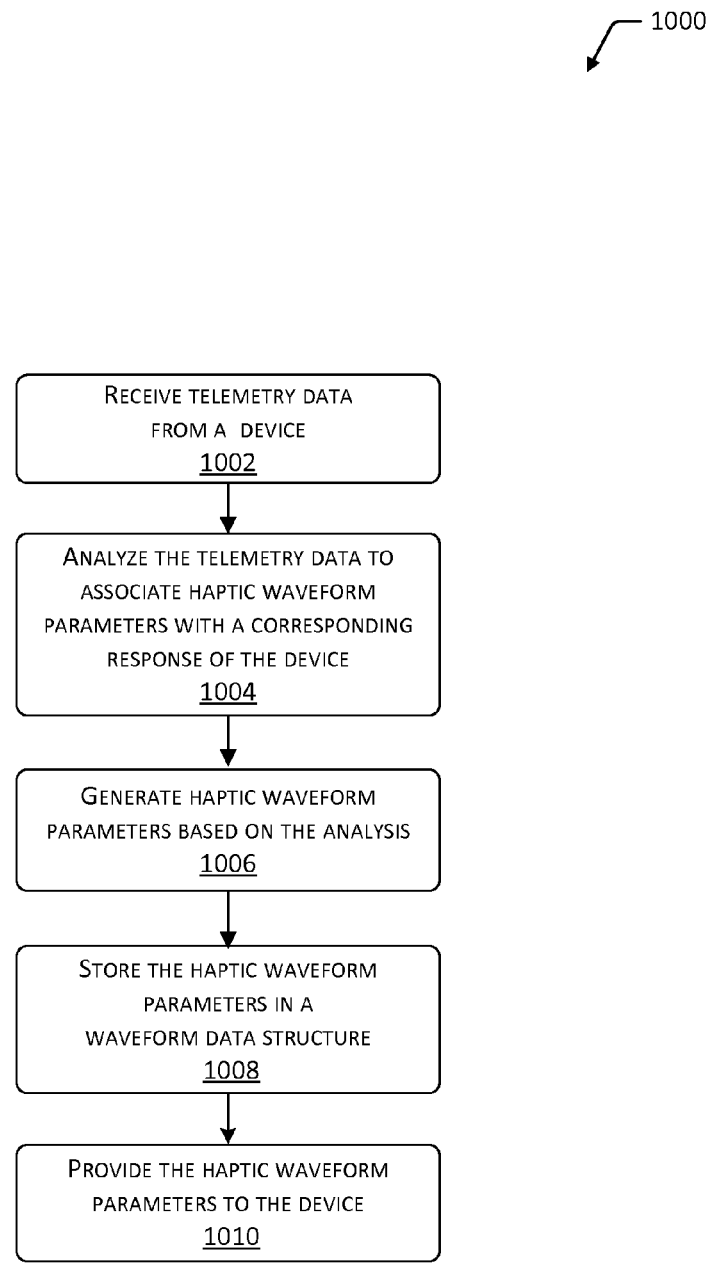
FIG. 10 is a flow diagram of an illustrative process of providing telemetry data from a device to a server and receiving adjusted haptic waveform parameters.

FIG. 10 is a flow diagram 1000 illustrating a process including analyzing telemetry data 124 and generating haptic waveform parameters 112 in response to the analysis. In some implementations, this process may be implemented by way of the device 102, the server 126, and the respective resources of each. The process of the flow diagram 1000 is illustrative and non-limiting, and other processes including one or more other steps, omitting one or more of the depicted steps, or proceeding in other orders of execution, may also be used.

Block 1002 receives telemetry data 124 from the device 102. For purposes of a present example, the device 102 provides telemetry data 124 to the server 126. The telemetry data 124 is indicative of particular haptic waveform parameters 112 recently used and characteristics of the resulting haptic response 106. In particular, the telemetry data 124 includes or encodes data acquired by way of the accelerometer signal 208.

Block 1004 analyzes the telemetry data 124 to associate haptic waveform parameters 112 with the corresponding device 102 haptic response 106. In the present example, the server 126 uses the haptic analysis module 822 to analyze the telemetry data 124. For instance, the peak amplitude 304 of the haptic response 106 may be inferred or estimated from a corresponding portion of the accelerometer signal 208 and checked for in-tolerance or out-of-tolerance performance. Similar checking may be performed with respect to the envelope 306, and so on, for other characteristics of the haptic response 106.

Block 1006 generates haptic waveform parameters 112(2) based on the analysis. In the present example, the haptic analysis module 822 generates new (or modified) haptic waveform parameters 112(2) in accordance with the analysis. For instance, the analysis may indicate that the peak amplitude 304 is 10% greater than specifically intended. Thus, the haptic analysis module 822 calculates a new peak voltage value that is 10% lesser than the peak voltage parameter used to generate the haptic response 106 under scrutiny. Other new or adjusted haptic waveform parameter 112(2) values may also be calculated for envelope 306, frequency, or other characteristics.

Block 1008 stores the haptic waveform parameters 112(2) in the waveform data structure 828. In the present example, the server 126 stores the just-calculated adjusted haptic waveform parameter 112(2) values in one of the waveform data structure 828 of the datastore 826. The adjusted haptic waveform parameters 112(2) are directed to correcting the excessive haptic response 106 reported by the telemetry data 124.

Block 1010 provides the haptic waveform parameters 112(2) to the device 102. In the present example, the server 126 provides the adjusted haptic waveform 112(2) to the device 102 by way of the network(s) 128. The device 102 may now store the adjusted haptic waveform 112(2) as haptic waveform parameters 112(1) within the waveform data structure 110. The adjusted haptic waveform parameters 112(1) may now be used during the next instance of the corresponding triggering event (e.g., 312).

The process described above relates to the server 126 receiving telemetry data 124 from a particular device 102, and responding with adjusted haptic waveform parameters 112(2) toward correcting specific haptic response issues of that device 102. In another instance, the server 126 may receive telemetry data 124 from a number of different devices 102. The respective telemetry data 124 may be analyzed on behalf of the reporting group of device 102, and common or similar non-compliances within their respective haptic responses 106 identified. The server 126 may then calculate or generate adjusted haptic waveform parameters 112(2) in accordance with the analysis, which are then provided to some or all of the corresponding devices 102 as a corrective action.

In yet another example, the server 126 may analyze telemetry data 124 from multiple devices 102, and then generate new haptic waveform parameters 112(2). Such a process may be performed toward providing new or enhanced haptic responses 106 in view of statistical analysis of past haptic responses 106. For example, analyzed telemetry data 124 may indicate that there are significantly fewer frequency-related out-of-tolerance occurrences when triangular wave shapes are used as compared to sinusoidal wave shapes. Thus, the server 126 may calculate new haptic waveform parameters 112 using triangular wave shapes, and provide these new haptic waveform parameters 112(2) to respective devices 102. The corresponding devices 102 may replace existing haptic waveform parameters 112(1) within their respective waveform data structures 110, accordingly.

Figure 11:
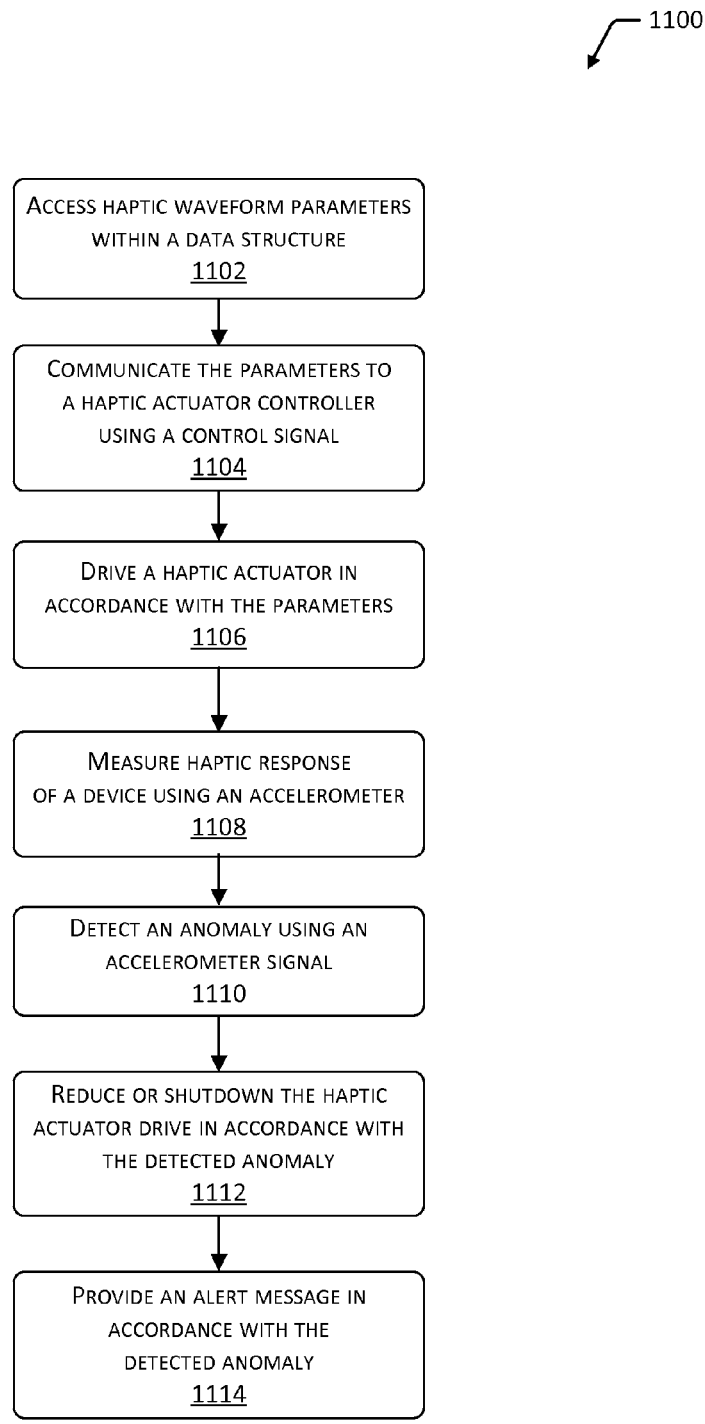
FIG. 11 is a flow diagram of an illustrative process of detecting an anomalous condition in a haptic response and reducing or shutting down the haptic output.

FIG. 11 is a flow diagram 1100 illustrating a process including analyzing telemetry data 124 and generating haptic waveform parameters 112 in response to the analysis. In some implementations, this process may be implemented by way of the device 102, the server 126, and the respective resources of each. The process of the flow diagram 1100 is illustrative and non-limiting, and other processes including one or more other steps, omitting one or more of the depicted steps, or proceeding in other orders of execution, may also be used.

Block 1102 accesses haptic waveform parameters 112 within the waveform data structure 110. For purposes of a present example, the processor 108 accesses the waveform data structure 110 in response to a triggering event 314. In particular, the user 104 is playing an auto racing game using the device 102, and has entered user input toward causing the race car to brake. The processor 108 retrieves the haptic waveform parameters 112 corresponding to the triggering event 314, accordingly.

Block 1104 communicates the haptic waveform parameters 112 to haptic actuator controller 114 using control signaling 202. In the present example, the processor 108 generates a control signal 202 digitally encoding the just-retrieved haptic waveform parameters 112. In particular, the control signal 202 calls for generation of a square wave of 18 Hertz frequency, 4.3 Volts peak value, exhibiting linear decay, over a total duration of 1 second.

Block 1106 drives the haptic actuator 116 in accordance with haptic waveform parameters 112. In the present example, the haptic actuator controller 114 receives the signal 202 from the processor 108. The haptic actuator controller 114 responds by generating a haptic waveform signal 204 in accordance with the haptic waveform parameters 112 encoded in the control signal 202. The haptic waveform signal 204 is provided to drive the haptic actuator 116 directly.

Block 1108 measures the haptic response 106 of the device 102 using the accelerometer 120. In the present example, the accelerometer 120 provides an accelerometer signal 208 to the processor 108 indicative of the various characteristics of the haptic response 106 presently being generated. The accelerometer signal 208 is therefore indicative of the wave shape, amplitude, frequency, envelope, and so on of the haptic response 106 now in progress.

Block 1110 detects an anomaly using the accelerometer signal 208. In the present example, the processor 108 analyzes the accelerometer signal 208 and detects that the haptic response is exhibiting a peak amplitude 70% below tolerance, and erratic wave shape. Thus, the accelerometer signal 208 indicates that the haptic actuator 116 is not operating correctly and is likely defective—perhaps drawing excessive electrical current from the haptic actuator controller 114.

Block 1112 reduces or shuts down the haptic actuator 116 drive in accordance with detected anomaly. In the present example, the processor 108 immediately ceases provision of the control signal 202. In response, the haptic actuator controller 114 immediately halts generation of the haptic waveform signal 204. The haptic output 118 from the apparently defective haptic actuator 116 is ended, thus possibly avoiding electrical damage to the haptic actuator controller 114 or other elements of the device 102.

Block 1114 provides an alert message in accordance with detected anomaly. The processor 108 issues an alert message to the user 104 indicative of the detected anomaly and the likely cause—a defective haptic actuator 116. The alert message may be textual, audible, or otherwise provided. Additionally, the processor 108 may optionally set a data flag, store information in the waveform data structure 110, or take other action to prevent future activations of the haptic actuator 116 until corrective measures are taken.

Those having ordinary skill in the art will readily recognize that certain components, steps, or operations illustrated in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium (CRSM) can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the disclosure encompass such changes and modifications that fall within the scope of the appended claims.

What is claimed is:

1. A portable electronic device, comprising:
a processor configured to:
 receive one or more haptic waveform parameters from a server; and
 provide a control signal configured to cause a haptic output comprising a vibrotactile haptic force to a portion of the portable electronic device;
a haptic actuator controller configured to receive the control signal and to provide a haptic waveform signal in accordance with the one or more haptic waveform parameters communicated by the control signal;
a haptic actuator configured to receive the haptic waveform signal and to generate the haptic output in accordance with the haptic waveform signal, the haptic actuator mechanically coupled to a structure of the portable electronic device;
an accelerometer mechanically coupled to the structure of the portable electronic device and configured to provide an accelerometer signal indicative of a haptic response of the portable electronic device to the haptic output comprising the vibrotactile haptic force; and
the processor further configured to:
 send telemetry data indicative of the accelerometer signal to the server to determine by the server that the haptic response of the user device is within a specification for the haptic output;
 compare the accelerometer signal to the specification for the haptic output to determine the haptic response of the portable electronic device deviates from a predefined haptic response waveform by greater than a tolerance value;
 receive from the server one or more generated adjusted haptic waveform parameters that are based on the comparing, by the server, the telemetry data indicative of the accelerometer signal to the specification for the haptic output; and
 generate a modified control signal based on the adjusted haptic waveform parameters received from the server to adjust the haptic output to correct the haptic response by causing the haptic response of the portable electronic device to be within the tolerance value of the predefined haptic response waveform.

2. The portable electronic device of claim 1, the processor further configured to select the haptic output from a plurality of predefined haptic outputs, wherein the predefined haptic outputs are associated with respective predefined triggering events, and wherein the predefined triggering events correspond to respective actions performable by the portable electronic device.

3. The portable electronic device of claim 1, wherein:
the processor is further configured to modify at least an amplitude parameter communicated by the control signal based on the comparing the accelerometer signal to the specification for the haptic output.

4. The portable electronic device of claim 1, the processor further configured to:
retrieve the one or more haptic waveform parameters from a data structure stored in machine-accessible storage, wherein the one or more haptic waveform parameters define at least an amplitude for the particular haptic output;
generate the control signal in accordance with the haptic waveform parameters; and
store the one or more haptic waveform parameters within the data structure.

5. The portable electronic device of claim 1, wherein the processor is further configured to:
anticipate a time lag between the haptic waveform signal and the accelerometer signal; and
adjust the control signal.

6. A device, comprising:
a haptic actuator configured to generate a first haptic output to cause a first haptic response;
an accelerometer configured to measure the first haptic response and to provide an accelerometer signal comprising one or more first haptic waveform parameters describing the first haptic response; and
the device is configured to:
 provide a first control signal to the haptic actuator to generate the first haptic output to cause the first haptic response at a first time, wherein the first control signal communicates the one or more first haptic waveform parameters describing the first haptic response;
 provide, using a network, telemetry data indicative of the accelerometer signal including the one or more first haptic waveform parameters describing the first haptic response;
 compare the accelerometer signal to a specification for the first haptic output to determine the first haptic response deviates from a predefined haptic response waveform by greater than a tolerance value;
 receive, using the network, one or more second haptic waveform parameters, wherein the one or more second haptic waveform parameters are generated based at least in part on the telemetry data;
 provide a second control signal using the one or more second haptic waveform parameters; and
 generate, by the haptic actuator in response to the second control signal, a second haptic output to adjust the second haptic output to cause a second haptic response at a second time to be within the tolerance value of the predefined haptic response waveform based on the one or more second haptic waveform parameters, the second haptic response being different from the first haptic response.

7. The device of claim 6, further configured to:
provide the second control signal in response to a predefined triggering event; and
change at least one of the one or more first haptic waveform parameters communicated by the first control signal based at least in part on the comparing the accelerometer signal to the specification for the first haptic output so as to generate the second haptic response at the second time.

8. The device of claim 7, further configured to:
retrieve the one or more first haptic waveform parameters correlated to the triggering event from a machine-accessible data structure, wherein the one or more first haptic waveform parameters include one or more of a wave shape or an amplitude value; and
encode information corresponding to the one or more first haptic waveform parameters within the first control signal.

9. The device of claim 8, further configured to:
change the one or more first haptic waveform parameters based at least in part on the comparing the accelerometer signal to the specification for the first haptic output; and
store the changed first haptic waveform parameters within the machine-accessible data structure.

10. The device of claim 6, further configured to provide a haptic waveform signal based on the first control signal, wherein the haptic waveform signal is provided to the haptic actuator, and wherein the haptic waveform signal is characterized in accordance with the one or more first haptic waveform parameters communicated by the first control signal.

11. The device of claim 6, further configured such that:
the first control signal is a digitally encoded signal; and
the haptic actuator is driven by an analog signal generated in accordance with the one or more first haptic waveform parameters communicated by the first control signal.

12. The device of claim 6, the device further including a computer-readable storage media storing one or more sets of haptic waveform parameters associated with data indicative of respective triggering events, the device further configured to select one of the one or more sets of haptic waveform parameters in order to generate the first haptic response, wherein one of the triggering events correspond to respective actions performable by the device.

13. The device of claim 12, the device further configured to perform one or more operations based on a machine-readable program code, the triggering event associated with a particular one of the operations.

14. The device of claim 6, further comprising a seat coupled to the haptic actuator, the seat configured to support a user in a seated orientation, wherein the device is further configured to communicate the first haptic response and the second haptic response to the seat.

15. The system of claim 6, wherein the one or more second haptic waveform parameters correspond to one or more different triggering events, and wherein the one or more second haptic waveform parameters include one or more wave shapes.

16. The system of claim 6, wherein the one or more second haptic waveform parameters are generated based on one or more of an enhancement or upgrade of the one or more first haptic waveform parameters.

17. A method comprising:
determining first haptic waveform parameters for defining a first haptic output;
generating a first haptic control signal based on the first haptic waveform parameters;
generating the first haptic output by driving a haptic actuator with the first haptic control signal;
measuring one or more characteristics of a first haptic response for the first haptic output of the haptic actuator using an accelerometer;
generating, by the accelerometer an accelerometer signal indicative of the one or more characteristics of the first haptic response;
using a network to send telemetry data indicative of the accelerometer signal from the accelerometer;
comparing the accelerometer signal to a specification for the first haptic output to determine the first haptic response deviates from a predefined haptic response waveform by greater than a tolerance value;
using the network to receive second haptic waveform parameters based at least in part on the telemetry data;
generating a second haptic control signal based on the second haptic waveform parameters; and
using the second haptic waveform parameters to provide a second haptic output to cause the second haptic response to be within the tolerance value of the predefined haptic response waveform.

18. The method of claim 17, wherein the first haptic waveform parameters are used to define a first portion of a second haptic output, the method further comprising generating a second portion of the second haptic output in accordance with the second haptic waveform parameters.

19. The method of claim 17, further comprising:
associating a triggering event with the second haptic waveform parameters, the second haptic waveform parameters stored within a machine-accessible media, the second haptic waveform parameters including an amplitude and a duration; and
storing the second haptic waveform parameters within the machine-accessible media.

20. The method of claim 17, further comprising:
detecting an anomaly associated with the first haptic response based at least in part on the comparison; and
modifying the first haptic response based on the detecting.

* * * * *